United States Patent
Hua

(10) Patent No.: US 9,439,040 B2
(45) Date of Patent: Sep. 6, 2016

(54) SYSTEM AND METHOD OF TIME OF FLIGHT DETECTION

(71) Applicant: Wensheng Hua, Fremont, CA (US)

(72) Inventor: Wensheng Hua, Fremont, CA (US)

(73) Assignee: Wensheng Hua, Fremont, CA (US)

( * ) Notice: Subject to any disclaimer, the term of this patent is extended or adjusted under 35 U.S.C. 154(b) by 0 days.

(21) Appl. No.: 14/826,128

(22) Filed: Aug. 13, 2015

(65) Prior Publication Data

US 2016/0050532 A1    Feb. 18, 2016

Related U.S. Application Data

(60) Provisional application No. 62/037,607, filed on Aug. 15, 2014.

(51) Int. Cl.
| | |
|---|---|
| *H04W 36/00* | (2009.01) |
| *H04W 4/02* | (2009.01) |
| *G06T 5/20* | (2006.01) |
| *H04W 24/08* | (2009.01) |

(52) U.S. Cl.
CPC .............. *H04W 4/023* (2013.01); *G06T 5/20* (2013.01); *H04W 24/08* (2013.01)

(58) Field of Classification Search
CPC ..... H04W 64/00; H04W 4/02; H04W 4/025; H04W 4/04; H04W 64/003
See application file for complete search history.

(56) References Cited

U.S. PATENT DOCUMENTS

| | | | | |
|---|---|---|---|---|
| 2009/0140887 | A1* | 6/2009 | Breed | G01C 21/165 340/990 |
| 2011/0111751 | A1* | 5/2011 | Markhovsky | G01S 3/74 455/423 |
| 2011/0142073 | A1* | 6/2011 | Jung | H04L 1/007 370/474 |
| 2015/0256972 | A1* | 9/2015 | Markhovsky | H04W 4/023 455/456.1 |

OTHER PUBLICATIONS

Misra, P. et al., "Global Positioning System-Signals, Measurements, and Performance", Chapter 2—GPS: An Overview, 2001, 41 pages, Ganga-Jamuna Press, Lincoln, MA.

* cited by examiner

*Primary Examiner* — Khalid Shaheed
(74) *Attorney, Agent, or Firm* — Edward C. Kwok; Hogan Lowells US LLP

(57) ABSTRACT

A position-determining apparatus, such as a GPS receiver, determines the position of the mobile device based on the time of flight of a transmitted probe signal using a method in which sections of the received signal is classified into two or more categories and accumulated according to categories before being used to compute the convolutions familiar in the context of a matched filter. Using the method of the present invention to compute the convolutions, and optionally applying additional time-saving techniques described herein, a position determination is achieved using a number of arithmetic operations that is significantly reduced from that required in prior art methods to compute the convolutions. The reduced number of arithmetic operations can reduce significantly the power consumption required of a device carrying out a method of the present invention, and thereby realizing a significant advantage.

32 Claims, 12 Drawing Sheets

SYSTEM AND METHOD OF TIME OF FLIGHT DETECTION

CROSS REFERENCE TO RELATED APPLICATIONS

The present application relates to and claims priority of U.S. provisional application ("Provisional Application"), Ser. No. 62/037,607, entitled "Time of Flight Detection," filed on Aug. 15, 2014. The Provisional Application is hereby incorporated by reference herein in its entirety.

BACKGROUND OF THE INVENTION

1. Field of the Invention

The present invention is related to measuring the distance between two objects based on a time of flight of a probe signal sent between the objects. In particular, the present invention is related to measuring the distance between two objects using a positioning system, such as the Global Positioning System (GPS).

2. Discussion of the Related Art

The "time of flight" of a signal is often used to determine the position or the time of the objects. The "time of flight" is a time-offset measured between the time a probe signal is sent and the time the probe signal is received. The distance between the objects is the product of the time of flight and the propagation speed of the probe signal (e.g., the speed of light, in the case of a GPS signal). In the GPS system, the time of flight is referred to as a "pseudo-range measurement." In many systems, the time of flight may be used in additional calculations. For example, in the GPS system, multiple pseudo-range measurements are used to determine a 3-dimensional position of an object relative to the earth. The clock offset may also be calculated to further refine the accuracy in the calculated location. Detailed descriptions of various aspects of the GPS system may be found, for example, in "Global Position System: Signals, Measurement and Performance" ("Enge") by Pratap Misra and Per Enge, and its cited references.

SUMMARY

According to one embodiment of the present invention, a position-determining apparatus, such as a GPS receiver, determines the position of the mobile device based on the time of flight of a transmitted probe signal using a method in which sections of the received signal is classified into two or more categories and accumulated according to categories before being used to compute the convolutions familiar in the context of a matched filter.

Using the method of the present invention to compute the convolutions, and optionally applying additional time-saving techniques described herein, the present invention allows a position determination to be achieved using a number of arithmetic operations that is significantly reduced from that required in prior art methods to compute the convolutions. The reduced number of arithmetic operations can reduce significantly the power consumption required of a device carrying out a method of the present invention, and thereby realizing a significant advantage.

The present invention is better understood upon consideration of the detailed description below in conjunction with the accompanying drawings.

DETAILED DESCRIPTION OF THE PREFERRED EMBODIMENTS

In the following detailed description, a probe signal transmitted between two objects may refer to a probe signal sent from one object and received by the other object or, alternatively, a signal sent by one object, reflected from the second object and then received by the first object. The present invention is applicable to the GPS or, more generally, the Global Navigation Satellite System (GNSS), which includes GPS, GLONASS, Galileo, Beidou, and other similar systems. In fact, the present invention is applicable not only to GNSS/GPS systems, but also in any time-offset measurement systems. For example, the present invention is applicable to measuring a time of fight of a radar probe signal that is sent from a radar antenna, reflected by the target object and then received by the radar antenna. As another example, the present invention is also applicable to determining a time of flight of a signal that is transmitted from a local sender to a local receiver to make a local position measurement. The time-of-flight technique can be applied to signal synchronization in communication systems. In this detailed description, a GPS receiver is used to illustrate the present invention. However, the present invention is not limited to application in a GPS receiver, but also in the applications mentioned above, as well as other applications.

Figure 1:
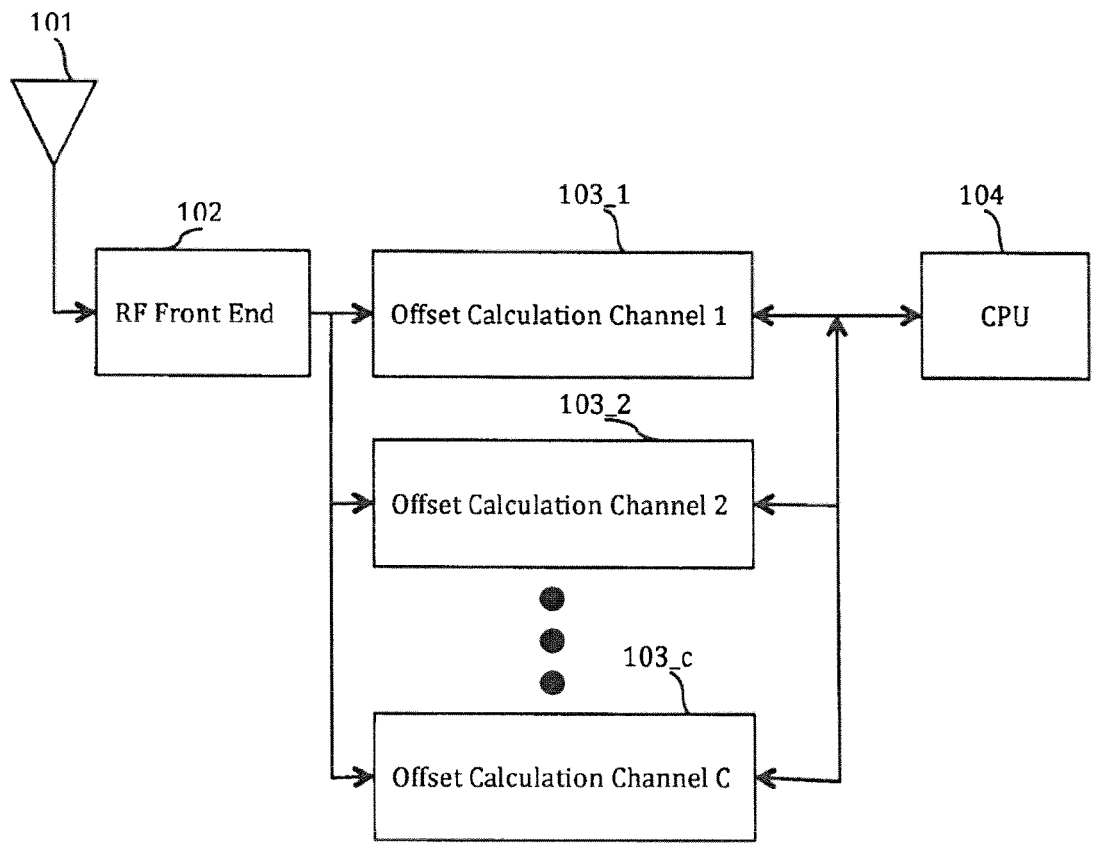
FIG. 1 is a block diagram of GPS receiver 100, in accordance with one embodiment of the present invention.

FIG. 1 is a block diagram of GPS receiver 100, in accordance with one embodiment of the present invention. As shown in FIG. 1, signals of multiple GPS satellites are received by antenna 101. These signals are typically amplified, demodulated and down-converted to an intermediate frequency (IF). Each signal may also be digitized by the RF front end 102 for processing in the digital domain. The resulting signal is then processed by one or more offset calculation channels, 103-1, 103-2, ... 103-c, each of which determines if the received signal includes a signal transmitted from a corresponding GPS satellite. For each GPS satellite signal identified, an offset or time of flight between that GPS satellite and GPS receiver 100 is calculated. CPU 104 further processes the offsets determined from the offset calculation channels 103-1, 103-2, ... 103-c to calculate receiver 100's position and time. CPU 104 also controls offset calculation channels, 103-1, 103-2, ... 103-c. Details of offset calculation channels, 103-1, 103-2, ... 103-c and their control are provided below. In FIG. 1, CPU 104 generally refers to both the CPU circuit itself and any memory, storage (e.g., RAM, ROM, FLASH memory, and hard disk drives) or other components necessary for supporting CPU operations.

Figure 2:
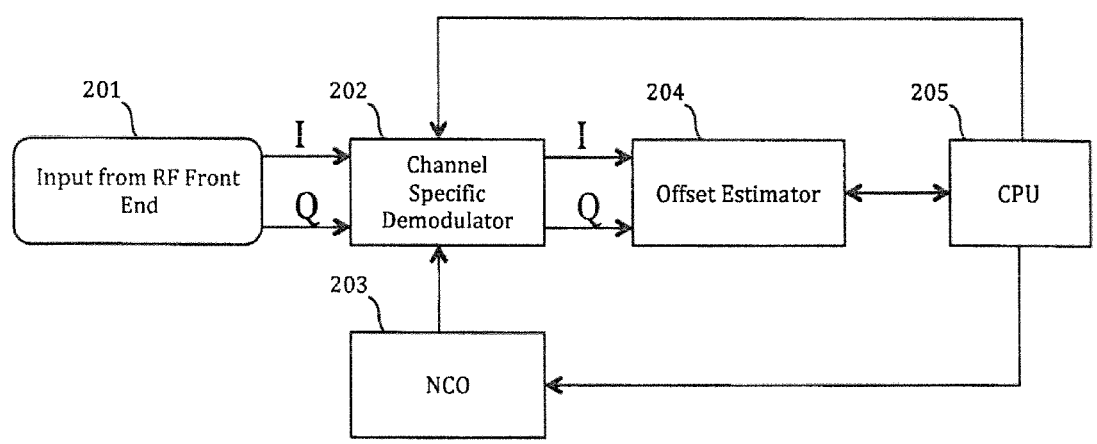
FIG. 2 is a block diagram showing an implementation of offset calculation channel 200, which is representative of any of channels 103-1, 103-2, ... 103-c of FIG. 1, according to one embodiment of the present invention.

FIG. 2 is a block diagram showing an implementation of offset calculation channel 200, which is representative of any of channels 103-1, 103-2, ... 103-c of FIG. 1, according to one embodiment of the present invention. As shown in FIG. 2, block 201 represents providing digitalized in-phase and quadrature signals (i.e., I and Q signals) generated from RF front end 102. The I and Q digitized quadrature signals are fed into channel-specific demodulator 202. Channel-specific demodulator 202, which receives a variable frequency signal from numerical oscillator (NCO) 203, removes any remaining frequency modulation effects caused by, for example, the Doppler effect, receiver movement, local clock drift and any other effects. Each channel includes a channel-specific NCO and a channel-specific demodulator, represented by NCO 203 and channel-specific demodulator 202 described above. The demodulated I and Q signals are then processed in offset estimator 204. CPU 205 controls NCO 203, channel-specific demodulator 202 and offset estimator 204. CPU 205 may be a stand-alone computational circuit, or may be implemented by CPU 104, which is the overall system control circuit shown in FIG. 1.

Figure 3:
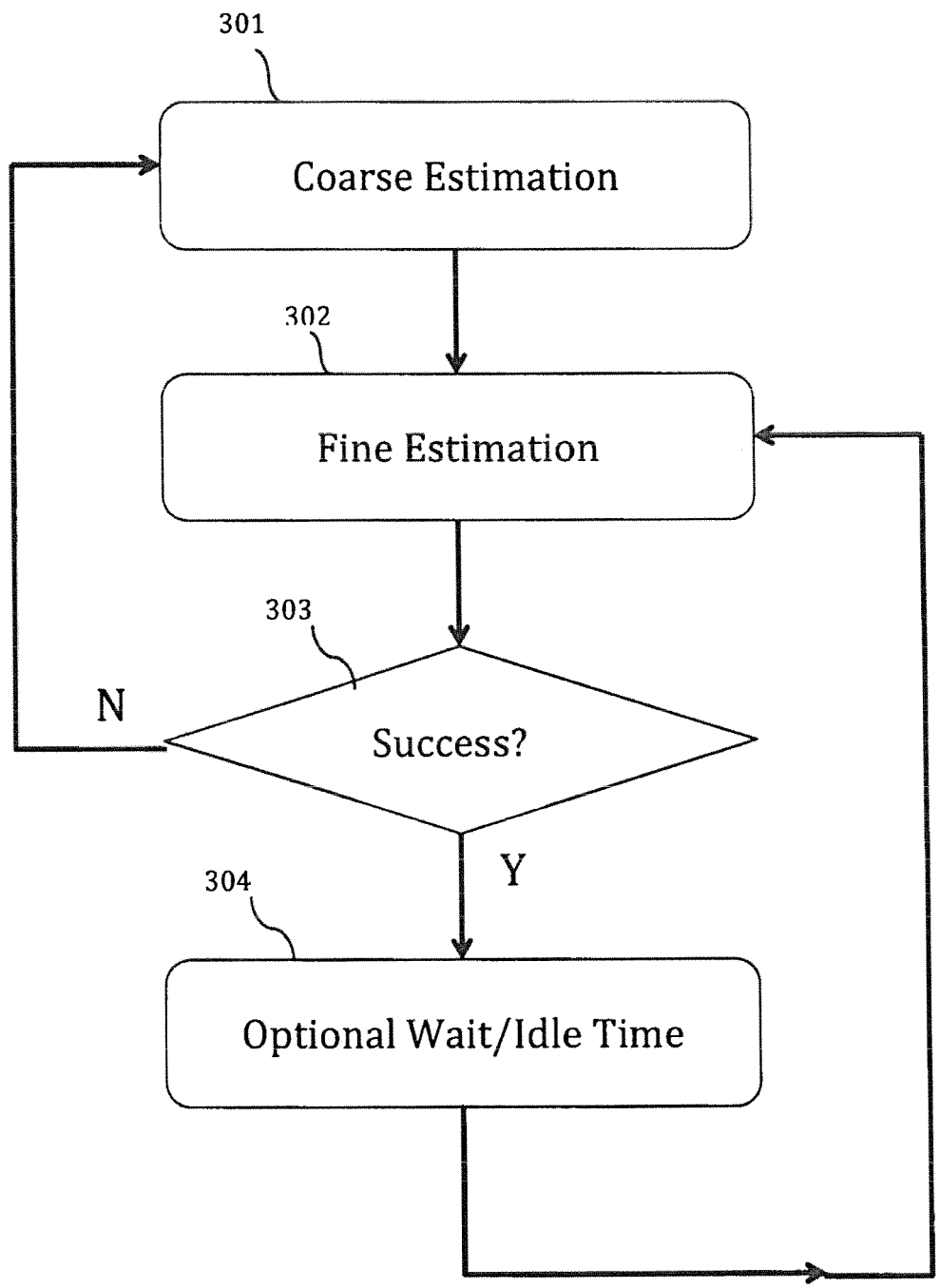
FIG. 3 is a flow chart that illustrates a method of operation for an offset calculation channel (e.g., offset calculation channel 200 of FIG. 2), in accordance with one embodiment of the present invention.

FIG. 3 is a flow chart that illustrates a method of operation for an offset calculation channel (e.g., offset calculation channel 200 of FIG. 2), in accordance with one embodiment of the present invention. As shown in FIG. 3, step 301 performs a coarse estimation, also commonly known as "signal acquisition" in many GPS/GNSS systems. Coarse estimation reduces the search ranges of the offset and the frequency modulation in preparation for a fine estimation, which is represented in FIG. 2 by step 302. For example, a coarse estimation or signal acquisition in a GPS system may provide a position accuracy of about 0.5 chip (each chip is a time unit that is about 1 ρs long) and a Doppler frequency estimation accuracy of between 100 Hz to 500 Hz. Coarse offset estimation can be assisted by reference to other information, such as a location estimate from a cell phone tower. A system that uses such assistance information is called an Assisted GPS (AGPS) system. Structures and operations of AGPS are discussed, for example, in Enge. Coarse estimation step 301 may also provide an estimate of the signal-to-noise ratio (SNR) in the received signal, an offset accuracy (or "offset error") and frequency accuracy (or "frequency error").

Step 302 provides a fine estimation, which estimates the offset and the frequency modulation each to a higher resolution. For example, in one embodiment of the present invention, a fine estimation searches over an offset between −0.5 chip to 0.5 chip, and a frequency modulation between −250 Hz to 250 Hz. Due to various reasons, either one or both of coarse estimation step 301 and fine estimation step 302 may not always succeed. At step 303, if an estimation step is not successful, coarse estimation step 301 is repeated. After a successful fine estimation step, the offset calculation channel may enter into a wait or idle step for a predetermined time (i.e., step 304), before repeating fine estimation step 302. The wait time reduces power consumption in GPS receiver 100.

Figure 4:
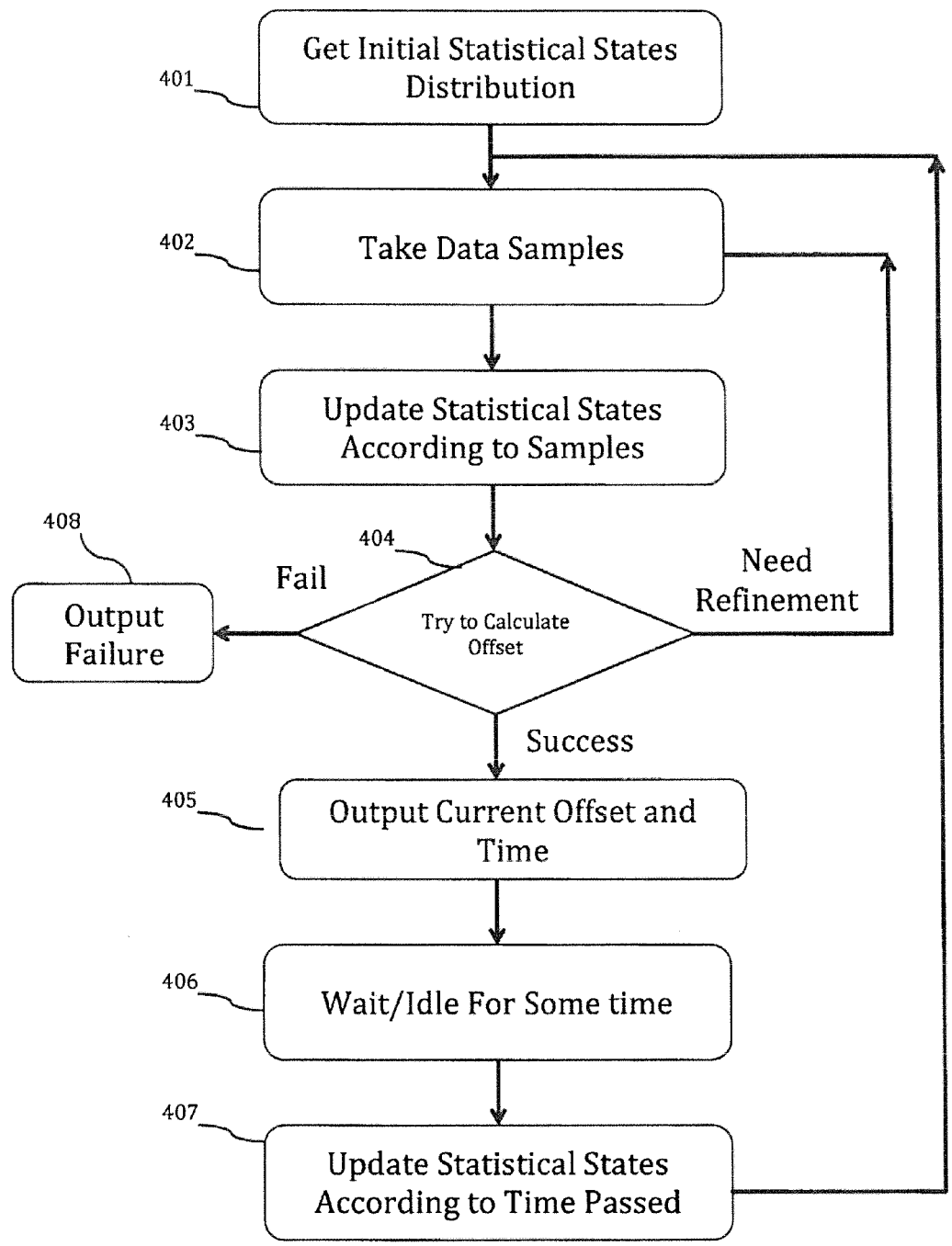
FIG. 4 is a flow chart that illustrates the operations in fine offset estimation step 302 of FIG. 3, in accordance with one embodiment of the present invention.

FIG. 4 is a flow chart that illustrates the operations in fine estimation step 302 of FIG. 3, in accordance with one embodiment of the present invention. Generally, the fine estimation step keeps and updates a set of statistical states based on data samples of the received signal collected and the time passed. In one embodiment, these statistical states are related to the probability distribution of the offset. (Conversely, the probability distribution of the offset may be derived from these statistical states). In some embodiments, the probability distribution of the offset can be used as the statistical states directly. For example, in one embodiment, the statistical states are represented by quantities that are proportional to the logarithms of the probability distribution. (Such a representation allows multiplications of probabilities to be performed as additions of the logarithms of the probabilities).

As shown in FIG. 4, at step 401, a prior estimation of probability distribution $P_0(x)$ of offset x is obtained. In one embodiment, probability distribution $P_0(x)$ may be obtained from coarse estimation step 301. For example, in one embodiment, a distribution $P(x)$ of offset x is obtained from a signal acquisition in a GPS receiver, with $P(x)$ spanning the search range $$x \in \left[\frac{-t_c}{2}, \frac{t_c}{2}\right],$$

where $t_c$ is the chip time. The probability that offset x is outside this search range in this embodiment is believed small. Initial distribution estimation $P_0(x)$ may be obtained from side information, such as assistance data from a cell tower. The initial search range can be the range covered by the communication range of the cell tower. In some embodiments, initial distribution $P_0(x)$ may be a rough estimate, while in other embodiments, a simple uniform distribution can be used, when only the range of offset x is estimated during signal acquisition. In other embodiments, when a standard deviation is estimated for offset x during signal acquisition, a Gaussian distribution may be used.

In step 402, data samples of the received probe signal are taken, which are used to update the probability distribution $P(x)$ at step 402. As probability distribution $P(x)$ corresponds to the statistical states in this embodiment, an update to probability distribution $P(x)$ at step 403 updates the statistical states. At step 404, an updated estimation for offset x is then performed based on the updated probability distribution $P(x)$. A successfully update for offset x is output at step 405. Alternatively, if the calculate value for offset x requires refinement to meet a predetermined accuracy requirement, additional data samples of the received probe signals are taken by returning to step 402. Otherwise, i.e., if offset x cannot be estimated within the current search range, a failure signal is output at step 408. In that case, a new coarse estimate is performed by returning to coarse estimation step 301, for example, as illustrated above in conjunction with FIG. 3. At step 406, upon a successful estimate of offset x, the estimator may wait or idle at step 406 for a predetermined time period to save power. The predetermined time period may be specified by the user. Probability distribution P(x)—and therefore correspondingly, the statistical states also—is updated at step 407, after a specified elapsed time at step 406. The offset can be estimated by calculating the expected value of offset x from probability distribution P(x). The variance of the estimation for offset x can also be obtained from the probability distribution. The operations for updating probability distributions and for performing data sampling may depend on the characteristics of the probe signal, its transmission, propagation, reception and processing.

Figure 5:
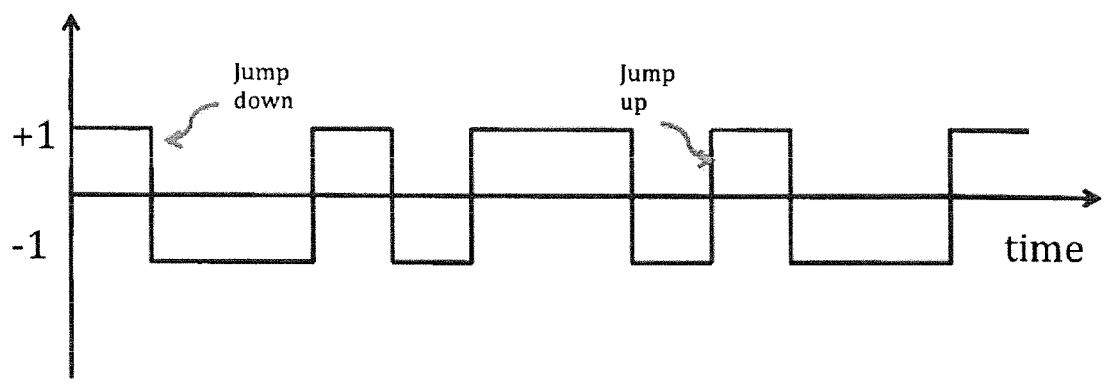
FIG. 5 shows a binary probe signal (i.e., having values expressed by either the +1 level or −1 level), in accordance with one embodiment of the present invention.

In one embodiment, a binary probe signal alternates between a +1 level and a −1 level, as illustrated in FIG. 5. As shown in FIG. 5, the probe signal may transition or "jump" from the +1 level to the −1 level, or from the −1 level to the +1 level. GPS C/A signal and GNSS BOC signals are examples of binary signals. The probe signal remains at each state for at least a chip before the next transition. In GPS/GNSS, each satellite is assigned a special code sequence, which is encoded in the transmitted signal by the +1 and −1 signal levels and periodically repeated. The code sequence spans 1023 chips in GPS C/A. The transmitted probe signal may be further modulated, such as by a predetermined carrier signal of a predetermined frequency (e.g., a carrier frequency at about 1.575 GHz for GPS C/A).

In one embodiment, the received signal is sampled at intervals each having a duration $t_s$ which is a fraction of chip time $t_c$:

$$t_s = \frac{t_c}{M} \quad (1)$$

where M is an integer. In some embodiments, one can also choose M to be close to an integer, or a fraction, and achieve the same or similar advantages of the present invention. The signal may distort along the way of processing and transmission. Typically, the signal passes through a transmission filter, a modulator, a transmission antenna, the communication channel (e.g., free space), a reception antenna, a receiver filter, and a demodulator. The distortion may exhibit itself as an actual longer transition time than its nominal time, resulting in a slope or other artifacts. In one embodiment, M is chosen so that, even in the distorted signal, each transition completes in less than duration $t_s$. In one embodiment, samples of the demodulated signal (at IF) from only I or Q (i.e., in-phase or quadrature, respectively) channels are used. When the demodulated signal has close to zero phase, only I channel is required. In some embodiments, both in-phase and quadrature samples are taken. When only one of the I and Q channels is used, the samples are taken at relative time 0, $t_s$, $2t_s$, $3t_s$, ..., $nt_s$, ... and are denoted y(0), y(1), y(2), ..., y(n), .... Alternatively, when both I and Q channels are sampled, the output signal y(n) is complex-valued:

$$y(n)=yI(n)+jyQ(n) \quad (2)$$

where $j=\sqrt{-1}$, and yI(n) and yQ(n) represent, respectively, the in-phase and quadrature samples of the demodulated signal at time n.

Let signal s(n) represent a replica of the probe signal with a time offset at the center of the estimated search range ("center probe signal"). Signal s(n) can be interpreted as the expected undistorted form of the received signal based on prior knowledge (e.g., knowledge from the coarse estimation step 301, described above). Further, let x denote the estimated offset between the noise-less demodulated signal and center probe signal s(n) ("relative offset"). The pseudorange and the location of the receiver may be derived based on relative offset x. Choosing signal s(n) to have a relative offset at the center of the search range is merely for mathematical convenience. The offset of signal s(n) may be set at any other position within the search range (e.g., at the beginning of the search range).

The probability distribution may be updated according to Bayes' Rule:

$$P(x|y) = \frac{P(x)P(y|x)}{P(y)} \quad (3)$$

where P(x|y) is an estimation of the probability distribution of offset x after samples y of the demodulated signal are observed. Since P(y) is independent of x, P(y) is a normalization factor that need not be explicitly calculated. Taking the logarithm on both sides of equation (3), one obtains the log likelihood equation.

$$L(x|y)=L(x)+L(y|x)-L(y) \quad (4)$$

where L denotes the log likelihood operation, or in general, $$L(P)=\log(P) \quad (5)$$

Let y(n) be modeled as the sum of a noise-less received signal z(n) and an additive noise $\epsilon(n)$:

$$y(n)=\gamma z(n)+\epsilon(n) \quad (6)$$

where $\gamma$ is the gain of the communication channel and $\epsilon(n)$ is assumed to have a Gaussian distribution. Signal z(n) may be assumed to be a shifted version of signal s(n) discussed above. (Empirically, based on analysis of the transitions of the received signal, this assumption is good for most cases.) That is:

$$z(n)=s(n-x) \quad (7)$$

where x denotes the relative offset. Thus, z(n) is also referred to in this detailed description as "the shifted signal."

Without loss of generality, one may set an expect magnitude of the signal to be 1 (i.e. E[|s(n)|]=1). The signal-to-noise ratio (SNR) of signal y(n) is provided by:

$$SNR = \frac{\gamma^2}{\sigma^2} \quad (8)$$

where $\sigma$ is the standard deviation of the Gaussian distribution of additive noise $\epsilon(n)$. Thus, $$L(y \mid x) = \sum_{n=0}^{N-1} L(y(n) \mid s(n-x)) \quad (9)$$

As additive noise $\epsilon(n)$ is presumed Gaussian:

$$L(y(n) \mid s(n-x)) = \beta_0 - \frac{1}{2\sigma^2}(y(n) - \gamma s(n-x))^2 \quad (10)$$

where $\beta_0$ is a constant. Accordingly, $$\sum_{n=0}^{N-1} L(y(n) \mid s(n-x)) = \quad (11)$$

$$N\beta_0 - \frac{1}{2\sigma^2}\left(\sum_{n=0}^{N-1} y^2(n) - \gamma^2 \sum_{n=0}^{N-1} s^2(n-x) + 2\gamma \sum_{n=0}^{N-1} y(n)s(n-x)\right)$$

Assuming that the $y^2(n)$ and the $s^2(n)$ terms are constant, equation (11) can be rewritten as:

$$\sum_{n=0}^{N-1} L(y(n) \mid s(n-x)) = \beta_1 + \frac{\gamma}{\sigma^2} \sum_{n=0}^{N-1} y(n)s(n-x) \quad (12)$$

where $\beta_1$ is a normalization factor. Define the quantity $L'(y\mid x)$ ("un-normalized log likelihood of signal y(n) given offset x") as:

$$L'(y \mid x) = \sum_{n=0}^{N-1} L'(y(n) \mid s(n-x)) = \frac{\gamma}{\sigma^2} \sum_{n=0}^{N-1} y(n)s(n-x) \quad (13)$$

Since the convolution operation over two signals v(n) and s(n) is given by:

$$conv(u, v, x) = \sum_{n=0}^{N-1} v(n)u(n-x) \quad (14)$$

Equation (13) can be rewritten as:

$$L'(y \mid x) = \sum_{n=0}^{N-1} L'(y(n) \mid s(n-x)) = \frac{\gamma}{\sigma^2} Conv(y, s, x) \quad (15)$$

Recalling from equation (8) above, the factor $$\frac{\gamma}{\sigma^2}$$

can be obtained from the SNR and $\sigma$:

$$\frac{\gamma}{\sigma^2} = \frac{\sqrt{SNR}}{\sigma} \quad (16)$$

Normalizing the probability distribution ensures that the sum of all probabilities equals 1. Define the un-normalized probability distribution:

$$P'(x \mid y) = P(x)e^{L'(y \mid x)} \quad (17)$$

Therefore, P(x|y) is given by:

$$P(x \mid y) = \frac{P'(x \mid y)}{\sum_x P'(x \mid y)} \quad (18)$$

Here, signal y(n) is a sequence of real numbers. Therefore, this result is directly applicable to the I or Q samples. In one embodiment, when the signal can be reliably demodulated, one need only use one of the two channels (e.g., the I channel alone). However, if signal y(n) is a sequence of complex numbers, i.e., when both I and Q channels are sampled (e.g., the signal of equation 2), the magnitudes of the convolution conv(y, s, x) and the gain γ are used:

$$L'(y \mid x) = \sum_{n=0}^{N-1} L'(y(n) \mid s(n-x)) = \frac{|\gamma|}{\sigma^2} |Conv(y, s, x)| \quad (19)$$

and $$\frac{|\gamma|}{\sigma^2} = \frac{\sqrt{SNR}}{\sigma} \quad (20)$$

If M samples are taken of each of $N_c$ chips, the total number N of samples is $N_cM$. Using a straight-forward implementation of the convolution, with the search range of offset x given as $N_{cx}$ chips, the total number $C_t$ of accumulate-multiply steps required to calculate conv(y, s, x) is:

$$C_t = M^2 N_c N_{cx} \quad (21)$$

In one embodiment, the number of accumulate-multiply steps required may be reduced significantly by dividing the probe signal into multiple sections and categorizing each section into one of a set of categories, and processing each section according to the assigned category. The categorization step may be performed in a pre-processing of the probe signal.

At run time, the samples of the demodulated signal are assigned to sections, guided by the center probe signal (i.e., signal s(n) described above). Each section is categorized to the same category as the corresponding section of center probe signal s(n). The samples of the demodulated signal are then accumulated in a set of accumulators A(k, m) based on category (k) and the sample index offset (m). The values in the accumulators are then used to calculate a convolution for each offset x in the search range.

Under the categorization scheme, each section of a given category in any shifted probe signal of relative offset x within search range $R_x$ is indistinguishable from any other section of the same probe signal assigned to the same category. Search range $R_x$ is referred to as the "allowed range", or the "allowed offset range." A signal that can be categorized to a finite number of categories is referred to as a "section-categorizable" signal. Binary signals are always section-categorizable.

Figure 6:
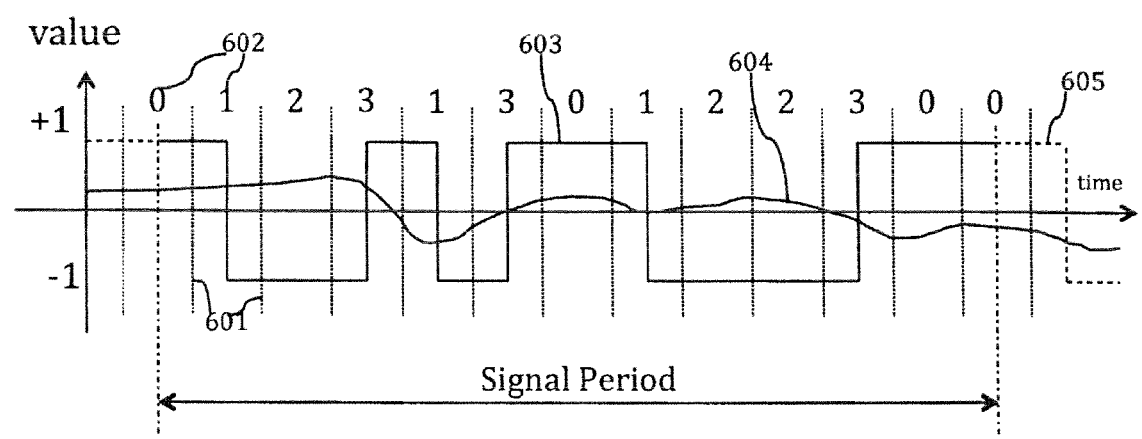
FIG. 6 illustrates dividing demodulated signal 604 into sections, in accordance with one embodiment of the present invention.

FIG. 6 illustrates dividing samples of demodulated signal 604 into sections, in accordance with one embodiment of the present invention. FIG. 6 also shows center probe signal 603. Section boundaries 601 are each set at the mid-point of a corresponding chip in probe signal 603. Each section lasts one chip time ($t_c$). As shown in FIG. 6, each section is categorized according to the waveform of probe signal 603 within the section. For example, the neighboring sections 602 are categorized to categories '0' and '1'. The categories of the remainder sections are similarly labeled. In the example of FIG. 6, category k of each section may be any one of four categories: (a) k=0, when all signal values within the section equal to the +1 level; (b) k=1, when the signal values within the section transition once from the +1 level to the −1 level; (c) k=2, when all signal values within the section equal the −1 level; and (d) k=3, when the signal values within the section transitions from the +1 level to the −1 level.

In FIG. 6, samples in a section of demodulated signal 604 are accumulated in an accumulator corresponding to the category of the assigned section and each sample's sample offset value. Note that the GPS C/A code is a periodic signal that repeats itself after every ms, and modulated on another signal ("information bits"). The information bits each have a period of about 20 ms.

Figure 7:
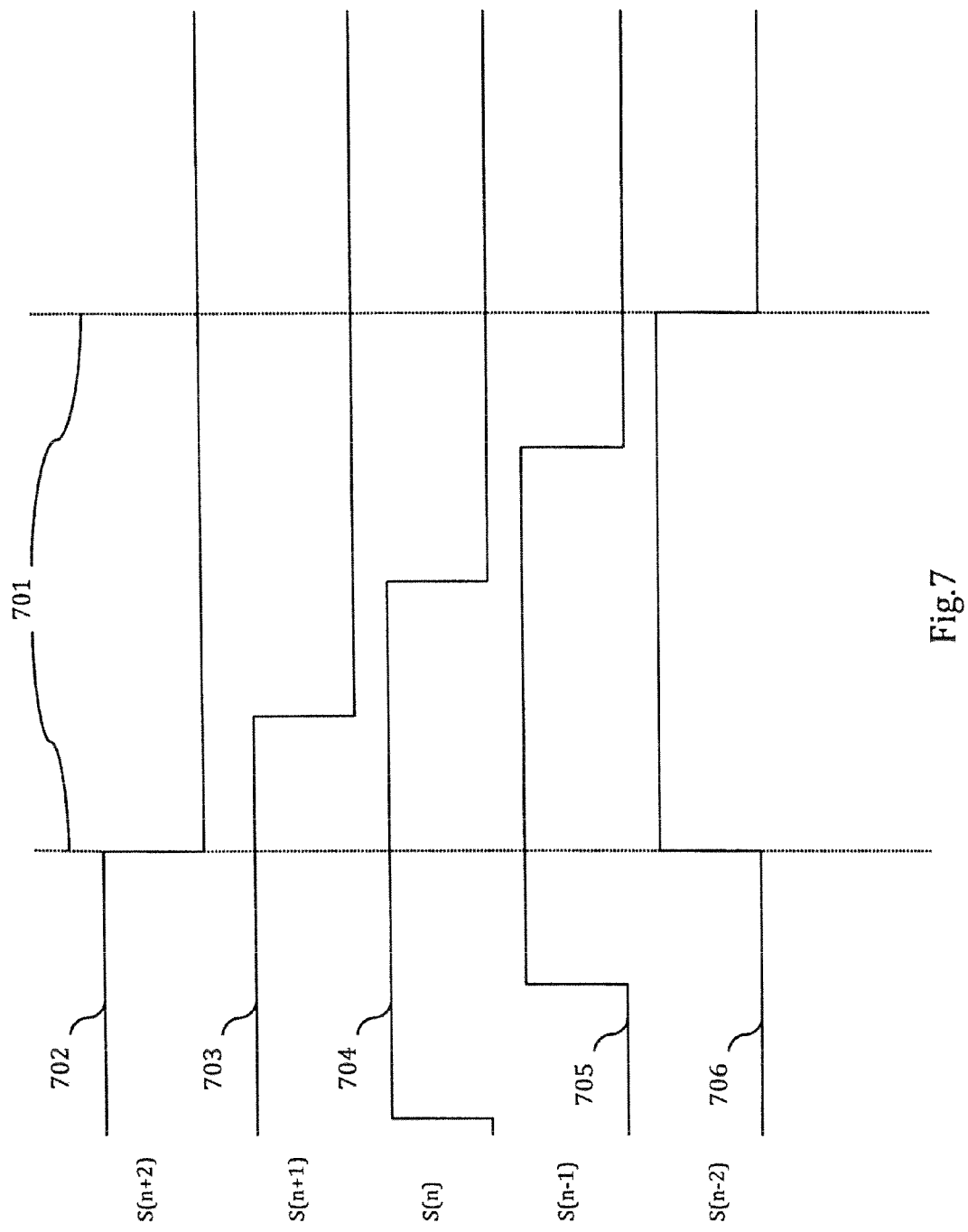
FIG. 7 shows the waveforms of probe signals 702, 703, 705, and 706, and center probe signal 704, before, between and after section boundaries 701, in accordance of the present invention.

FIG. 7 shows the waveforms of shifted probe signals 702, 703, 705 and 706, and center probe signal 704, before, between and after section boundaries 701, in accordance of the present invention. Shifted probe signals 702, 703, 705 and 706 are obtained by offsetting the center probe signal 704 by relative offsets −½, −¼, ¼, and ½ chips, respectively (i.e., within the offset range of $[-t_c/2, t_c/2]$). In FIG. 7, shifted probe signals 702, 703, 705 and 706 are also labeled S(n+2), S(n+1), S(n−1) and S(n−2), respectively. Center probe signal 704 is labeled S(n). As the signal values of center probe signal 704 transition only once from the +1 level to the −1 level between section boundaries 701, the section is assigned category k=1, according to the categorization scheme described above. In FIG. 7, a sampling rate of 4 samples per chip time may be used (i.e., ¼ chip between samples). Since center probe signal s(n) does not have a transition within a half-chip time outside of section boundaries 701, in each shifted probe signal, all sections that are categorized to the same category k=1 have the same waveform within their respective section boundaries. That is, all sections of shifted probe signals 702, 702, 703 and 705 that are categorized to k=1 have their respective waveforms between section boundaries the same as those shown within section boundaries 701. FIG. 7 thus illustrate "single-T categorization," as the offset range is about one chip-time long.

Categorization may be used to reduce the number of arithmetic operations needed for calculating the convolution of each relative offset x. Formally, the convolution between the received signal and a shifted probe signal of relative offset x is given by:

$$Conv(y, s, x) = \sum_{n=0}^{N-1} y(n)s(n-x) = \sum_{c}^{C-1}\sum_{m=0}^{M-1} y(cM+m)s(c, m-x) \quad (22)$$

where c denotes a section index, C denotes the number of sections within the convolution period, m denotes a sample index for the m-th sample within a section, s(c, m−x) denotes the signal value for the m-th sample in section c of shifted probe signal s(n−x), x being the relative offset, and y(cM+m) denotes the m-th sample in section c of the demodulated signal.

Figure 12:
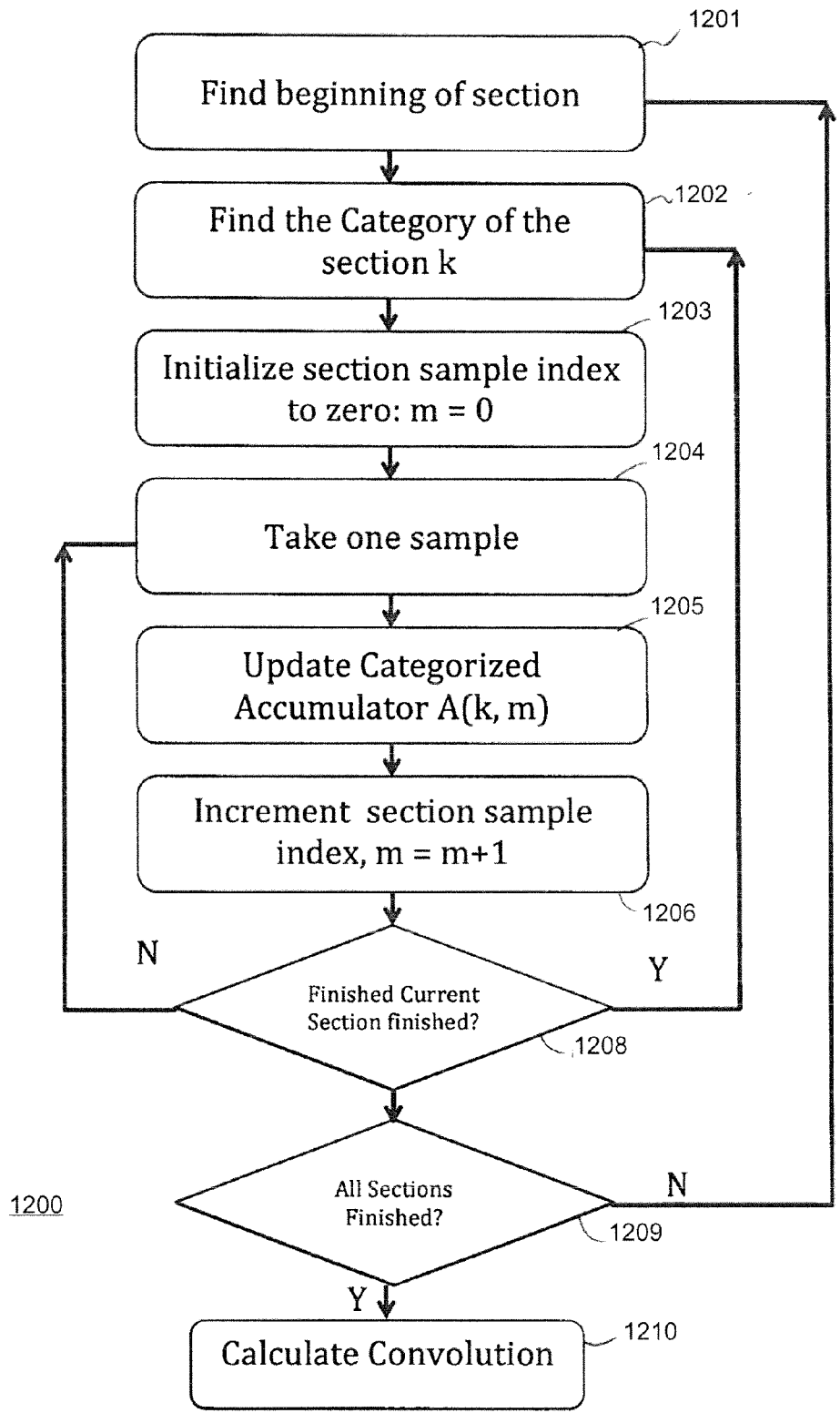
FIG. 12 is a flow chart illustrating method 1200 for operating an accumulator, according to one embodiment of the present invention.

Let K be the total number of categories to which a section can be categorized. As discussed above, within each category k, the signal value s(c, m−x) is the same for all c<C, relative offset x being within allowed range $R_x$. Thus, signal value s(c, m−x) in a section categorized to category k may be denoted s(k, m−x). Accordingly:

$$Conv(y, s, x) = \quad (23)$$
$$\sum_{c}^{C-1}\sum_{m=0}^{M-1} y(cM+m)s(c, m-x) = \sum_{k=0}^{K-1}\sum_{m=0}^{M-1} s(k, m-x)\sum_{c \in k} y(cM+m)$$

where c∈k denotes section c that is categorized to category k. The accumulation of the samples of the demodulated signal in section c, i.e., $\Sigma_{c \in k} y(cM+m)$, may be performed using a set of accumulators. Let:

$$A(k,m) = \Sigma_{c \in k} y(cM+m) \quad (24)$$

denote the accumulated value in the accumulator for accumulating samples of sections categorized to category k with section sample index m. Then, K×M accumulators are needed, one for each k and each sample offset index. FIG. 12 is a flow chart illustrating method 1200 for operating an accumulator at run time, according to one embodiment of the resent invention. As shown in FIG. 12, at step 1201, the beginning of a section is identified. At step 1202, the section category k is determined or looked-up from a previously calculated table. Then, the M accumulators for category k are identified. By iteratively performing steps 1204-1208, the sample values y(cM), y(cM+1), ... y(c(2M−1)) are each added to a corresponding accumulator. When all sample values in the section are accumulated, at step 1208, the process is repeated for the next section, until the sample values of all sections of the demodulated signal needed for the current set of convolutions have been accumulated (step 1209). Thus, if each convolution involves N samples of the demodulated signal, the total number of accumulate operations equal N=MN$_c$ (note that there is no multiplication performed for the portion of Equation 23):

$$C_a = MN_c \quad (25)$$

At step 1210, for each relative offset x, the convolution Conv(y, s, x) is calculated using the values in the accumulators:

$$Conv(y, s, x) = \sum_{k=0}^{K-1}\sum_{m=0}^{M-1} s(k, m-x)A(k, m) = \sum_{k=0}^{K-1} conv(s(k), A(k), x) \quad (26)$$

Equation 26 shows that each convolution of length N is transformed into the sum of K convolutions, each of M samples and MN$_{cx}$ offsets. In general, Equation 26 requires:

$$C_{sum} = KM^2 N_{cx} \quad (27)$$

accumulate-multiply operations and $$C_{sa} = KMN_{cx} \quad (28)$$

additions. Accordingly, under the method of FIG. 12, the total number of arithmetic operations required for all relative offsets is much reduced:

$$C_{total} = C_a + C_{sum} + C_{sa} \approx MN_c + KM^2 N_{cx} \quad (29)$$

There are numerous ways to implement the accumulators. In one embodiment, the accumulator operations are performed by a general purpose processor (e.g., a central processing unit, or CPU), or shared accumulator hardware. In that embodiment, the accumulated results (and states) of the accumulators are stored in different memory locations in the memory system. In another embodiment, the accumulators are implemented as hardware accumulators and the values to be accumulated by such accumulators are sent to them by the system. In other embodiments, one can use a combination of any of these approaches.

The above method can be applied to any signal that is section-categorizable. In the example of FIG. 6, the section length is selected to be the chip time. However, one may select another section length, which likely leads to a greater total number of categories (K). For a binary signal, such as a GPS/GNSS signal, there are additional ways to further reduce the required arithmetic operations. Even with the section length selected to be the chip time, one can reduce the required arithmetic operations by applying a mask signal to both the samples and the center probe signal. The mask signal, denoted $m_s(n)$, may have a uniform signal value (+1 level or −1 level) for each section. In other words, $$m_s(n)=m_s(cM+m)=s(cM) \text{ for all } m<M \text{ and } c<C \quad (30)$$

Note that $m_s(n)m_s(n)=1$. One may also use other mask signals. For example, one may select the uniform signal value for each section of the mask signal to be the signal value of the center probe signal at the late boundary of the section. Since $m_s(n)m_s(n)=1$, $$Conv(y, s, x) = \sum_{n=0}^{N-1}(y(n)m_s(n))(m_s(n)S(n-x)) = \sum_{n=0}^{N-1}y_m(n)s_m(n-x) \quad (31)$$

where $y_m(n)=y(n)m_s(n)$ is the masked sample signal and $s_m(n-x)=m_s(n)s(n-x)$ is the masked shifted probe signal.

Figure 8:
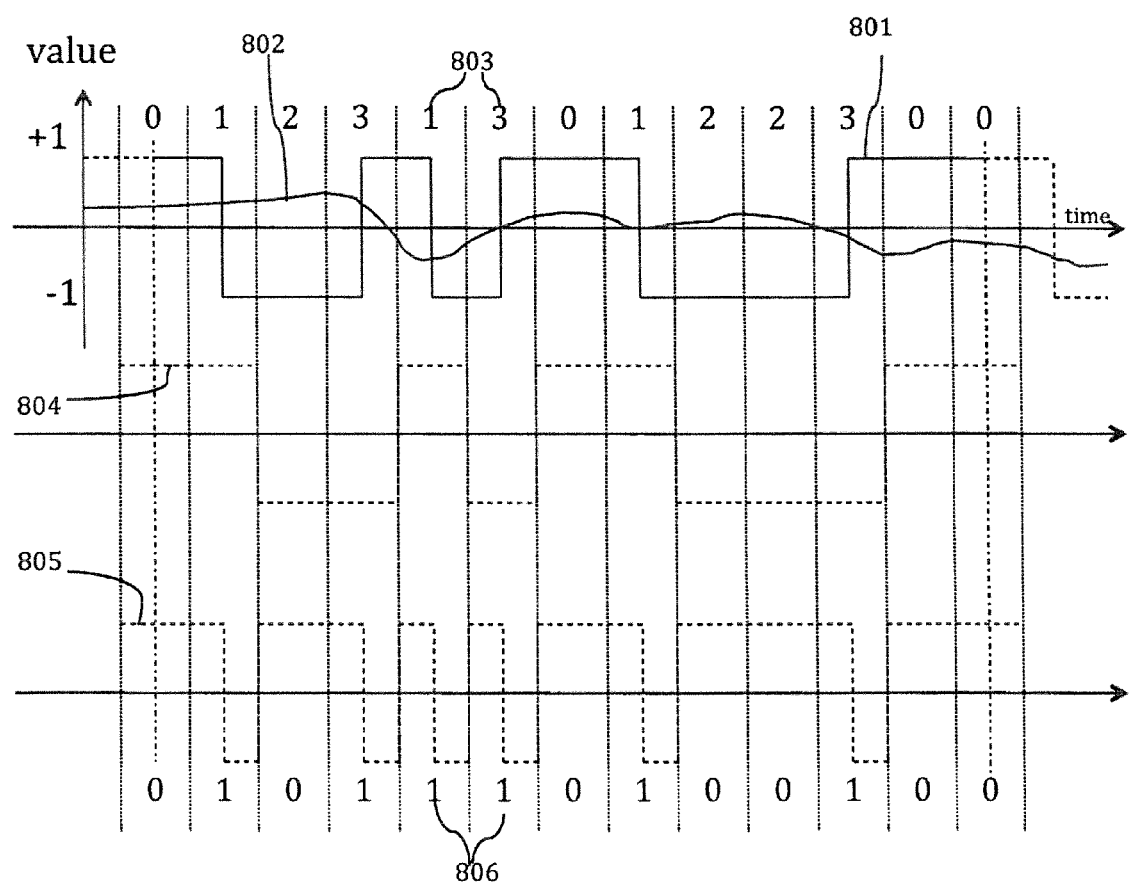
FIG. 8 illustrates masked probe signal $s_m(n)$, according to one embodiment of the present invention.

FIG. 8 illustrates masked probe signal $s_m(n)$, according to one embodiment of the present invention. As shown in FIG. 8, probe signal 801 (i.e., probe signal $s(n)$) is used to construct mask signal 804 which, in turn, provides masked probe signal 804 (i.e., masked probe signal $s_m(n)$) shows the masked probe signal $s_m$. Each section of the masked signal 805 may be assigned to one of two categories: k=1, which has a transition within the section, or k=0, which does not have a transition within the section. Mask signal 804 transforms both a −1 level to +1 level transition and a +1 level to −1 level transition in probe signal 801 to a +1 level to −1 level transition in masked probe signal 805. Mask signal 804 also transforms a section with a uniform +1 level signal value or a uniform −1 level signal value to a uniform +1 signal level. The value of the masked sample signal $y_m(n)=y(n)m_s(n)$ may be calculated before the resulting sample is accumulated in the corresponding accumulator, while masked probe signal $s_m(n)$ may be pre-computed. The technique of masking is referred to in this detailed description as the "masking technology." Since the number of categories is reduced by one-half in this example, the resulting circuit has a lesser footprint. In a software implementation, the number of arithmetic operations required in computing the convolutions is also correspondingly reduced.

Figure 9:
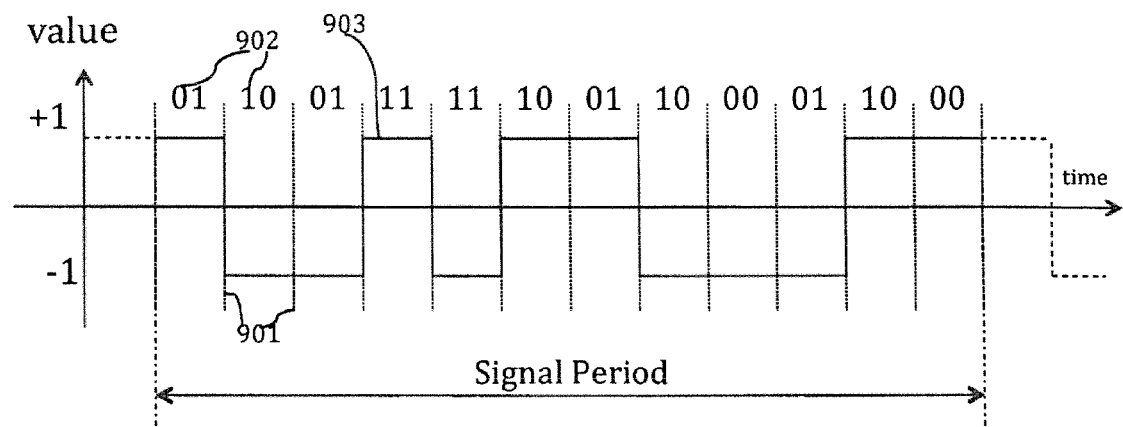
FIG. 9 illustrates a categorization scheme for center probe signal 903, in which the 2-bit value representing the category of each section is assigned based on whether or not transitions exist in the previous and the following chips, in accordance with one embodiment of the present invention.

Other ways to categorize sections of a probe signal are described next, which allow convolutions of larger offset ranges to be more efficiently calculated. For example, in one embodiment, the chip boundaries are used as section boundaries. The masking technology illustrated by Equations 30 and 31 may be applied to both the probe signal and the sample signal (i.e., the demodulated received signal). The sections of the masked center probe signal may be categorized by whether or not there is a signal value transition within the previous and the following chips. As there are 4 possible categories, the categories are denoted using 2-bit values. When there is a transition in the previous chip, the first bit of the 2-bit category is assigned a '1'; otherwise, it is assigned a '0'. Similarly, when there is a transition in the following chip, the second bit of the 2-bit category is assigned a '1'; otherwise it is assigned a '0'. FIG. 9 illustrates this categorization scheme for center probe signal 903, in accordance with one embodiment of the present invention. As shown in FIG. 9, the section boundaries are labeled 901. The categories of the sections are provided, as indicated by reference numeral 902. This categorization scheme provides an allowed offset range of $[t_c, t_c]$, which is twice as large as that of the single-T categorization scheme illustrated by FIG. 6.

Similar techniques allow even greater offset ranges. In general, one may:
1. use chip boundaries as section boundaries;
2. mask both the probe signal and the sample in the manner illustrated by Equations 30 and 31; and
3. categorize the sections using values in $C_n$ previous chips and $C_n$ following chips.

Under this method, the category may be encoded by a $2C_n$-bit binary number, with each bit corresponding to whether or not the signal value in the current section is equal to the signal value in the corresponding one of chips at relative offsets $-C_n, \ldots, -1, 1, \ldots, C_n$. If a signal value within a chip is the same as the signal value in the current section, the corresponding bit in the category value is '0'; otherwise, the corresponding bit in the category value is assigned '1'. As a result, the category value can be any of $2^{2C_n}$ values, and the allowed offset range is $[-C_n t_c, C_n t_c]$.

One can also extend the allowed offset range for calculating convolution, if one sets the section boundaries at the mid-points of chips, such as shown in FIG. 6:
1. use mid-points of the chips as section boundaries;
2. mask both the probe signal and the sample in the manner illustrated by Equations 30 and 31; and
3. categorize each section using a category value that encodes whether or not there is a transition in the current section and each of $C_n$ previous sections and $C_n$ following sections.

Figure 10:
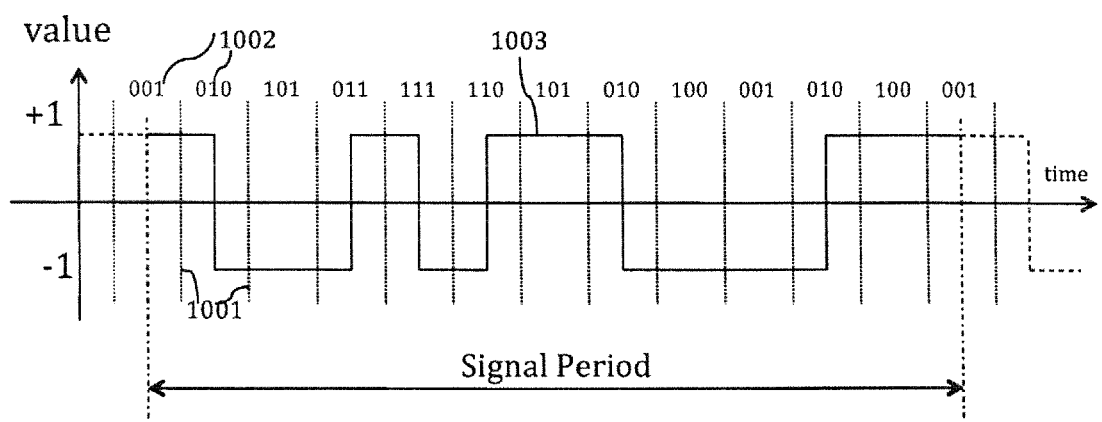
FIG. 10 illustrates a categorization scheme in which the category of a section is encoded by a 3-bit value representing, respectively, whether or not the previous, current and next section includes a signal transition, according to one embodiment of the present invention.

Under this method, the category value is a $2C_n+1$-bit binary number. The value of each bit corresponds to a section having one of the relative offsets: $-C_m, \ldots, -1, 0, 1, \ldots, C_n$. If there is transition within the corresponding section, the corresponding bit is assigned a '1'; otherwise, the corresponding bit is assigned a '0'. The allowed offset range under this method is $[-(C_n+½)t_c, (C_n+½)t_c]$, and the category value may be any of $2^{2C_n+1}$ values. FIG. 10 illustrates this method for the case $C_n=1$, according to one embodiment of the present invention. In FIG. 10, section boundaries 1001 are selected to be mid-points of the chips in probe signal 1003. As category 1002 value encodes whether or not the previous, current or following chip includes a signal transition, there are 8 categories.

For binary probe signals, the number of arithmetic operations in a convolution calculation for a given relative offset x may be further reduced. For example, consider two functions v and u, where u have binary values (i.e. the value of u(i) is either 1 or −1), similar to the probe signals discussed above. Then the convolution of signals u, v for a relative offset of x is given by:

$$Conv(u, v, x) = \sum_{i=0}^{l-1} u(i-x)v(i) \qquad (32)$$

$$Conv(u, v, x+1) = \sum_{i=0}^{l-1} (u(i-x-1) - u(i-x))v(i) + \qquad (33)$$
$$u(i-x)v(i)$$
$$= Conv(u, v, x) \sum_{i=0}^{l-1} (u(i-x-1) - u(i-x))v(i)$$

Because a probe signal of the type we discussed above are binary-valued, and multiple samples are taken at every chip, the value of the term $u(i-x-1)-u(i-x)$ is often zero. Hence, $Conv(u, v, x)$ may be calculated recursively in the following manner:

Step 1: calculate $Conv(u, v, 0)$;
Step 2: initialize $x=0$;
Step 3: calculate $$\sum_{i=0}^{l-1} (u(i-x-1) - u(i-x))v(i)$$

Step 4: calculate $Conv(u, v, x)$ using Equation (33) and the result of step 3; and
Step 5: increment x by 1 and repeat Steps 3-5 until all values of x have been computed.

For example, when $v(n)$ if a +1 level to −1 level transition function in a section of center probe signal $s(n)$:

$$v(n) = \begin{cases} 1, & \text{for } n < 0 \\ -1, & \text{for } n \geq 0 \end{cases} \qquad (34)$$

Then, $$\sum_{i=0}^{l-1} (u(i-x-1) - u(i-x))v(i) = 2v(n) \qquad (35)$$

Consequently, the convolution may be calculated by order M steps, using order M additions, order M subtractions and order M multiple-by-2 operations, rather than the order $M^2$ multiplications and additions required for a conventional calculation.

The powers of the signal and the noise of the received signal may be estimated using the convolution results. For a general digital signal $h(n)$, its power of the signal is defined as $|h(n)|^2$. Therefore, the power of signal $y(n)$, represented by N samples, is given by:

$$P_y = \frac{1}{N} \sum_{n=0}^{N-1} |y(n)|^2 \qquad (36)$$

Let $x_{max}$ to denote the relative offset that yields the maximum correlation magnitude $C_{max}$, i.e., $$C_{max} = Conv(y, s, x_{max}) \qquad (37)$$

The expected value of the gain, $E[\gamma]$, is given by:

$$E[\gamma] = \frac{C_{max}}{N} \qquad (38)$$

The power of the signal, $P_s$, can be obtained using the maximum correlation value:

$$P_s = |E[\gamma]|^2 = \frac{|C_{max}|^2}{N^2} \qquad (39)$$

The signal-to-noise ratio can be calculated using:

$$SNR = \frac{P_s}{P_y - P_s} \qquad (40)$$

In a GPS/GNSS system, $P_y \gg P_s$, so that:

$$SNR \cong \frac{P_s}{P_y} \qquad (41)$$

The standard deviation σ of additive noise c (approximated by a Gaussian distribution) can be estimated using:

$$\sigma = \sqrt{P_y} \qquad (42)$$

When both the signal-to-noise ratio SNR and signal power $P_y$ (or standard deviation σ) are known, the expected magnitude of the maximum convolution value $C_{max}$ is given by:

$$E[|C_{max}|] \cong N|E[\gamma]| = N\sigma\sqrt{SNR} = N\sqrt{(SNR)P_y^2} \qquad (43)$$

where N is the number of the samples in the convolution calculation. The expected magnitude of maximum convolution value $E[|C_{max}|]$ can be used to detect if the offset x is within the search range (i.e., the estimate of offset x is successful). If the measured maximum convolution value $C_{max}$ is too small:

$$|C_{max}| < \alpha_{cmax} E[|C_{max}|] \qquad (44)$$

where $\alpha_{cmax}$ is a design parameter, then the relative offset x is likely out of range. In some embodiments, one may choose $\alpha_{cmax} = 10$.

In some embodiments, one or more samples may be skipped (i.e., not accumulated in the accumulators). In one embodiment, for an offset search range of $[t_c/2, t_c/2]$, using single-T categorization and masking as discussed above, the contribution of a sample in a non-transition section (i.e., category 0) to each convolution is the same, regardless of the relative offset. Hence, contributions by "category 0" sections do not change the relative likelihood for any relative offset x. Thus, such sections do not affect the end result after normalization. Thus, accumulation of samples in category 0 sections may be skipped.

In each section, the relative offset x of the samples in the section is defined with respective of center probe signal $s(n)$. The original sample's index is represented by $n=cM+m$. where c is the section number and m is sample section index. Within a given section, if center probe signal $s(n)$ has a transition just between sample index $$m = \frac{M}{2} - 1$$

and sample index $$m = \frac{M}{2},$$

sample index $$m = \frac{M}{2} - 1$$

is the time point defined to have a relative offset x=0.

Therefore, s(cM+m) has a relative offset $$x = m - \frac{M}{2} + 1.$$

In one embodiment, M is chosen to be an even number. In other embodiments, where M is an odd number, one can use floor(M/2) instead of M/2 to be the time point with zero relative offset.

The total number of arithmetic operations may be further reduced, taking advantage of the probability distribution of offset x. For example, taking into account samples that have been taken and processed, offset x is more likely to be within a smaller range of relative offsets. In one embodiment, calculations involving samples that are unlikely to correspond to a rapidly changing portion of the probe signal can be skipped. The rapidly changing part of a binary probe signal is the part that is close in time to where a transition from +1 level to −1 level, or from level −1 to level +1, occurs. The samples that are unlikely to correspond to a rapidly changing part of the probe signal are likely to correspond to an unchanging part of the probe signal. Thus, these samples are unlikely to contribute to a measure that distinguishes between the likelihood of different offsets, and thus may be skipped (i.e., need not be accumulated in the corresponding accumulators).

In category 1 sections (i.e., sections in which a transition occurs in the corresponding probe signal) under single-T categorization and masking, the probability that a transition happens just after the sample at relative offset x equals the probability that the received signal has relative offset x. Hence, one can use the probability of the relative offset to determine which samples may be skipped. If the probability of relative offset x is smaller than a certain threshold, the calculations corresponding to relative offset x may be skipped.

Other probabilities may also be used to determine which samples in sections that are not likely to have a transition may be skipped. For example, in one embodiment, an average of probabilities P(n−1) and P(n) can be used to determine if the sample at relative offset n may be $$P_2(n) = \frac{1}{2}[P(n) + P(n-1)] \quad (45)$$

This is because, when n is out of the search range for relative offset x, P(n)=0. Average probability $P_2(n)$ should be normalized, if needed. Another way to determine to skip is to use a cumulative probability:

$$P_c(n) = \sum_{i=0}^{n} P(i) \quad (46)$$

Under this scheme ("probability threshold scheme"), one may select a value $P_{c0}$, and skip the samples at certain relative offsets c when $P_c<P_{c0}$ or $1-P_c<P_{c0}$. In some embodiments, $P_{c0}$ may be chosen to have a value between 0.1 and 0.3, for example. Alternatively, $P_{c0}$ may be adjusted empirically or determined by a simulation.

Figure 11:
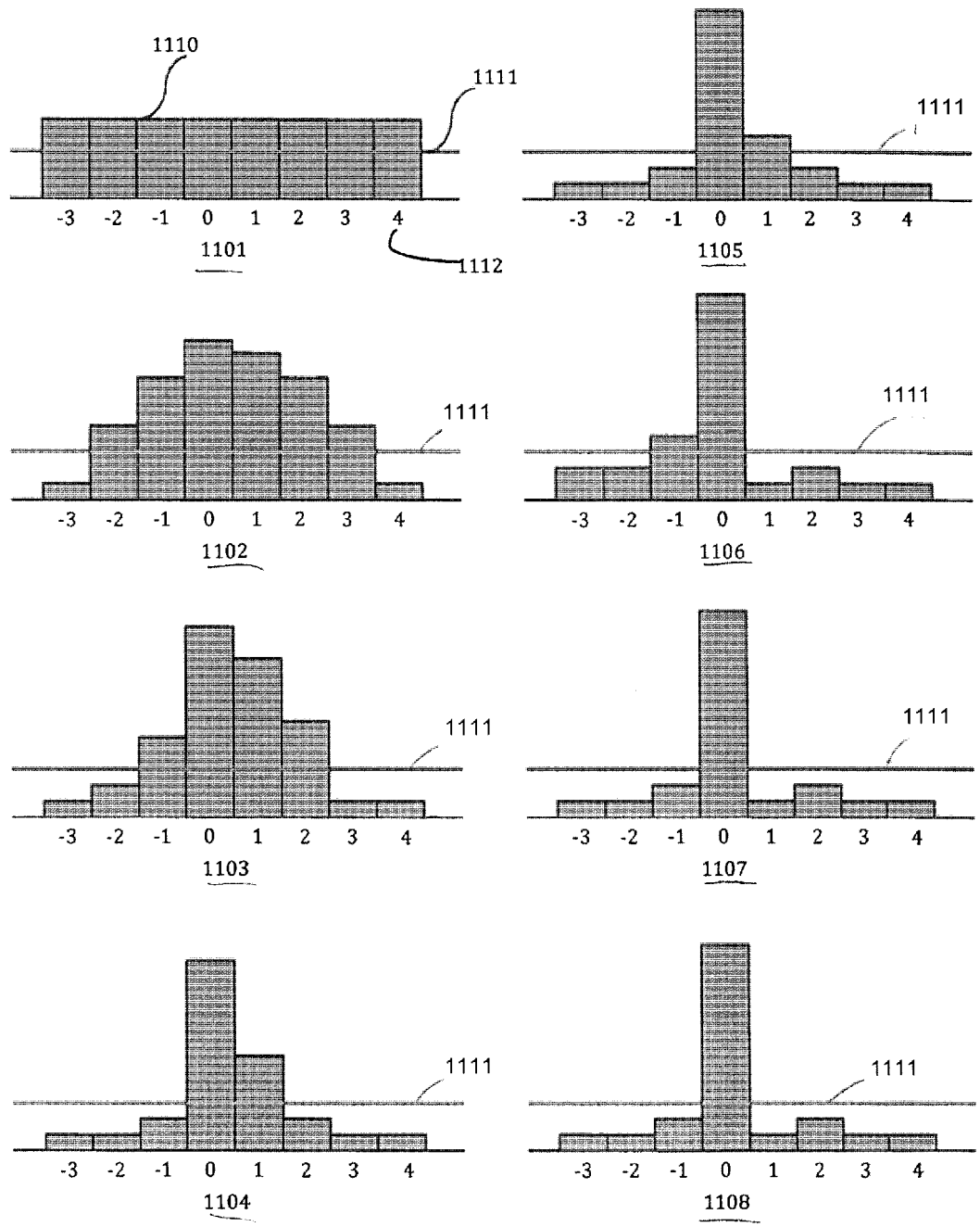
FIG. 11 shows how, using the probability threshold scheme, the probability distribution of relative offset x evolves in time for category 1 sections under single-T categorization and masking (i.e., sections in which a transition occurs in the corresponding probe signal), in accordance with the present invention.

FIG. 11 shows how, using the probability threshold scheme, the probability distribution of relative offset x evolves in time for category 1 sections under single-T categorization and masking (i.e., sections in which a transition occurs in the corresponding probe signal), in accordance with the present invention. In FIG. 11, accumulations of samples in unchanging sections have been skipped. Initially, illustrated by probability distribution 1101, the probability distribution for relative offset x is assumed to be uniform. The probability distribution for relative offset x evolves in time as illustrated in order by probability distributions 1101, 1102, 1103, 1104, 1105, 1106, 1107, and 1108. Each bar (e.g., bar 1110) provides the probability value corresponding to a relative offset value (e.g., relative offset value 1112). Line 1111 represents the threshold probability value. If the probability for relative offset x is less than the threshold probability value, samples corresponding to that relative offset are skipped.

New samples are taken and added to accumulators A(k, m) continuously. The accumulators are not reset between iterations. A convolution is calculated in between two iterations (e.g., iterations of steps 1201 to 1209, for the method illustrated in FIG. 12) in order to calculate a probability distribution. In some embodiments, the accumulators may be adjusted for the time passed before a convolution is calculated (the probability distribution is thereby adjusted as well).

Probability distribution 1102 results after some samples of the demodulated received signal have been taken and processed. The probabilities of relative offsets −3 and 4 are found less than threshold 1111. Hence, samples of the demodulated signal at relative offsets −3 and 4 are skipped in the next iteration, leading to probability distribution 1103. At this point, the probabilities of relative offsets −3, −2, 3, and 4 fall below probability threshold value 1111 and thus samples at these relative offsets are skipped in the next iteration. Additionally, samples at relative offsets −1 and 2 are skipped in the following iterations based on probability distribution 1104 and 1105.

During this process, although samples at certain relative offsets are skipped, the convolutions of all relative offsets inside the search range are still calculated. The skipped samples are not accumulated, which is equivalent to having a zero signal value). Thus, the probability of any relative offset may still change (and may sometimes even become larger). For example, even though samples corresponding to relative offset −1 are not accumulated immediately after probability distribution 1104 is presented, the probability of relative offset −1 in a subsequent probability distribution (i.e., probability distribution 1106), the probability for relative offset −1 actually increased. In the iteration after probability distribution 1106 is presented, accumulation of samples at relative offset −1 resumes. By keeping track of the probabilities for all (or at least some) relative offsets in the search range whether or not samples are accumulated for some of the relative offsets within the range, the resulting method is robust to statistical fluctuations.

Often, a single relative offset remains that exceeds threshold 1111, such as shown for relative offset 0 in probability distribution 1107. In one embodiment of the invention, the sampling and the probability updates are kept running after that event, such as illustrated by probability distribution 1108, which results after one or more iterations following probability distribution 1107.

The number of samples that is accumulated before each probability distribution (or other statistical states) is computed need not be fixed. Selecting an appropriate value at any given time is a trade-off between avoiding accumulating samples that should be skipped and avoiding computing probability updates too often. The optimal value minimizes the overall amount of computation, which results in reduced power consumption.

Sample-skipping may be implemented in any of a number of different stages in the system. For example, in one embodiment, the signal samples that are skipped are received into the analog-digital converter (ADC). In another embodiment, the signal samples are received into the ADC, but the converted digital samples are not saved into memory. In another embodiment, the samples are saved in memory but are not provided to the accumulators.

Signal samples may be buffered by the system. In one embodiment, each sample is processed directly after it is received into the ADC. In another embodiment, after digitization in the ADC, the samples may be buffered in memory for processing at a later time.

Sample-skipping is based on the principle that one can avoid taking or using samples that have such a low probability of contributing to a probability distribution as to affect differentiating among the high-probability possible offsets of the signal. This result can be achieved in many in different ways. In some embodiments, one can achieve the same or similar results by adjusting the sampling frequency:

1. taking samples at a lower initial sampling rate;
2. calculating a probability distribution of the possible offsets;
3. when a range of offsets have probabilities that are significantly less than the others, those low-probability offsets are marked to be skipped;
4. when the remaining offset range (i.e., the range of offsets corresponding to samples that are not skipped) is small enough (e.g., less than a half of the previous range), increasing the sample frequency (e.g., by a factor of 2); and
5. repeating steps 2-5 until the desired offset resolution is archived.

The value in the accumulator for the samples at the corresponding relative offset may be used to provide a finer estimate for the relative offset, e.g., an estimate with a resolution finer than the sampling time.

In one embodiment, the system keeps track of the number of samples $N_s(k, x)$ that are added into the accumulator, where k is the category and x is the relative offset. The relative offset translates into the sample index by the relation m=x+M/2−1. (The accumulator value can also be looked up A(k, x), using this relation.)

Denote a sub-sample portion of the relative offset to be $x_s$. When a transition occurs just after the sample at relative offset x, i.e. $x_s=0$, the expected value of the accumulator (denoted as A(1, x), where 1 denotes the category that has a signal transition)

$$\bar{A} = N_s(1,x)\sqrt{(SNR)p_y} \qquad (47)$$

where $p_y$ is the average power of the demodulated signal and where SNR is the signal-to-noise ratio of the demodulated signal. When the transition occurs just before the sample, i.e. $x_s \approx -1$, the expected accumulated value in the accumulator is $-\bar{A}$. The fractional relative offset $x_s$ of the sample can be calculated by interpolating between the cases.

$$x_s = \frac{A(1, x)}{2\bar{A}} - \frac{1}{2} \qquad (48)$$

Note that A(1, x) in equation 48 represents accumulation of the samples of the demodulated received signal. Thus, A(1, x) is presumably a real number. Any imaginary part can be disregarded in equation 48. The overall estimate of the relative offset $x_a$ is given by:

$$x_a(x) = x + x_s(x) \qquad (49)$$

When there are more than one estimated relative offset, the overall offset z may be estimated by a weighted sum of the $x_a(x)$:

$$\bar{x} = \sum_x P(x) x_a(x) \qquad (50)$$

where P(x) is the probability of relative offset x. In some embodiment the summation is over all x in the search range. In other embodiments, the summation can be over only the relative offsets that has probability larger than the probability threshold. Equation 50 provides a better estimation of the offset than the expected value of the probability distribution. However, when the probability is widely distributed over the search range, Equation 50 may not be effective. Hence, a simple expected value method may be more appropriate in some embodiments.

The system may change over the time samples are taken and processed. For example, the user's location may change, the local clock may drift, or other conditions may change. In some embodiments, such changes may be significant. One way to handle such changes is to update the probability distributions over time, such as to let the convolution values (or, equivalently, the log likelihood) fade away over time:

$$conv_t(y, s, x) = e^{-\frac{t}{\tau}} conv_0(y, s, x) \qquad (51)$$

where $conv_0(y, s, x)$ is the convolution value at an initial time point and $conv_t(y, s, x)$ is the convolution value after a time interval τ (i.e., the fading time). Variable τ may be seen as a design parameter that depends on the dynamics of the object being measured. Roughly, a sample that is taken more than a predetermined time τ prior to the current time should not contribute significantly to the current convolution value. For example, in one embodiment, for an object moving at a speed of about 30 meters per second, variable τ may be set to one second. Variable τ may also be adjusted empirically or determined by simulation.

As new samples are taken, the convolution calculated using the new samples may be added to the then existing convolution values. Therefore, the accumulator values can also be faded:

$$A_t(k, x) = e^{-\frac{t}{\tau}} A_0(k, x) \tag{52}$$

The un-normalized log likelihood may also be similarly faded:

$$L_t = e^{-\frac{t}{\tau}} L_0 \tag{53}$$

Many of the specific embodiments discussed in this detailed description are selected for notation convenience. Many variations may be used to achieve the same results, For example, in one embodiment, one may use the following procedure:
1. take samples around the transitions of the signal;
2. adjust the sign of the samples taken according the direction of signal transition (i.e., from level +1 to level −1 or from level −1 to level +1);
3. calculate the convolutions by first grouping the samples.

This procedure is equivalent to the masking-categorization (with k=1) procedure described above in conjunction with FIG. 8.

Note that different components of this invention can be selected to use or not use in different embodiments of this invention. For example, in one embodiment, one can chose to only use the skipping method to reduce the total amount of calculation. One can take samples that are expected to be close to the jumps of the signal and skip the samples that are expected to be far away from the jumps. Then, one can use the traditional method of calculate convolution based on those signals. In that embodiment, the categorization component is not used, however, total mount of calculation/power is still reduced comparing to the methods without skipping.

Numerical oscillator 203 of FIG. 2 may operate based on estimations of the phase $\phi$ and the frequency f of the IF carrier signal from RF front end 201. One implementation of NCO 203 may provide both in-phase and quadrature signals:

$$N_I(n) = \cos(\phi + 2n\pi f t_s)$$

$$N_Q(n) = \sin(\phi + 2n\pi f t_s) \tag{54}$$

In some embodiments, one can simply use binary signals rather than sin and cos signals:

$$N_I(n) = \text{sign}(\cos(\phi + 2n\pi f t_s))$$

$$N_Q(n) = \text{sign}(\sin(\phi + 2n\pi f t_s)) \tag{55}$$

Where sign(•) is the sign function:

$$\text{sign}(x) = \begin{cases} 1, & \text{for } x < 0 \\ -1, & \text{for } x \geq 0 \end{cases} \tag{56}$$

To avoid costly floating-point calculations, angular rate $\omega = 2\pi f t_s$ and phase $\phi$ may both be represented as integers. The sign(cos(x)) and the sign(sin(x)) can be calculated using the total phase at sample n, which is given by: $\phi_n = \phi + \omega n$.

The RF front end (e.g., RF Front end 102 of FIG. 1) removes most of the frequency modulation from the received signal. Any remaining frequency modulation may be removed by a channel-specific demodulator, which is achieved using:

$$I_O(n) = I_i(n) N_I(n) - Q_i(n) N_Q(n)$$

$$Q_O(n) = I_i(n) N_Q(n) + Q_i(n) N_I(n) \tag{57}$$

where $I_O(n)$ and $Q_O(n)$ are the output data samples, and $I_i(n)$ and $Q_i(n)$ are the data samples.

In some embodiments, frequency and phase estimations can be done using conventional frequency and phase tracking loops. To reduce the amount of calculations and the power consumption, the following or a similar method may be used.

Coarse estimation (or signal acquisition) provides an initial estimation of the frequency modulation. Initially, the phase and the frequency of NCO 203 may be set to zero or any other convenient initial value. Then, samples may be taken for the signal acquisition calculations. After signal acquisition, the frequency and phase of NCO 203 may be set to initial values:

$$f = f_0; \phi = 0 \tag{58}$$

where $f_0$ is the frequency estimation from the signal acquisition. Next, one way to estimate the phase is to take some samples during a time interval $T_c$ and calculate a number of convolutions over the search range determined by the signal acquisition step. The phase $\phi_m$ of the convolution with the maximum absolute value, $C_{max}$, provides an estimation of the average remaining phase during the time interval $T_c$.

$$\phi_m = \text{phase}(C_{max}) \tag{59}$$

In a preferred embodiment of the invention, $T_c$ is chosen using the following criteria:
1. $T_c$ should be short enough so that phase change $\delta\phi$ during the time period is small. For example, one criterion for $T_c$ may be:

$$T_c < \frac{\delta\phi_1}{2\pi\delta f} \tag{60}$$

where $\delta f$ is the frequency resolution and $\delta\phi_1$ is a selected phase error. The phase change $\delta\phi$ of the received signal over selected interval $T_c$ will be less than $\delta\phi_1$. In some embodiments $\delta\phi_1$ can be chosen between $\pi/6$ and $\pi/2$.
2. $T_c$ should be chosen large enough so that enough samples may be taken for making a reliable phase measurement. For example, one criterion for $T_c$ may be:

$$T_c > \frac{(\delta\phi_2)^2 t_s}{SNR} \tag{61}$$

In some embodiment the phase error $\delta\phi_2$ may be a value selected between $\pi/6$ and $\pi/4$.

The frequency can be estimated by performing two phase estimations separated by time interval $T_m$. $T_m$ may be selected to be as long as possible, but is kept short enough so that the phase change during the period should be less than $2\pi$, so as to avoid phase skipping. That is, $$T_m \delta f 2\pi < 2\pi \tag{62}$$

where δf is the accuracy of the frequency estimation before the phase measurements. This implies:

$$T_m < \frac{1}{\delta f} \quad (63)$$

In some embodiment, a safety margin may be applied (e.g., $T_m = 0.3/\delta f$).

Denote the results of a first and second phase measurements $\phi_{m1}$ and $\phi_{m2}$ and their accuracies (i.e., resolutions) $\delta\phi_1$ and $\delta\phi_2$, respectively. The measured frequency may be obtained by:

$$f_m = \frac{\phi_{m2} - \phi_{m1}}{T_m} \quad (64)$$

The accuracy of frequency, δf after the two measurements is given by:

$$\delta f = \frac{\sqrt{\delta\phi_1^2 + \delta\phi_2^2}}{T_m} \quad (65)$$

After the measurements, the phase and the frequency of the numerical oscillator may be updated using the following relations:

$$\phi_+ = \phi_- - \phi_{m2}$$

$$f_+ = f_- - f_m \quad (66, 67)$$

where $\phi_-$ and $f_-$ are the phase and frequency of the NCO before the update and $\phi_+$ and $f_+$ are the phase and frequency of the NCO after the update, respectively.

In one embodiment, this two-step phase-frequency update is run each time prior to performing a fine offset estimation. In some other embodiment, this two-step phase-frequency update is run multiple times recursively until a certain frequency accuracy level is achieved. For example, recursive updates may run until δf<10 Hz.

In one embodiment of the invention, a Kalman filter can be used to estimate the phase and frequency. This is a more robust and accurate method than the two-step phase-frequency method, at the expense of greater computation (i.e., greater power).

The state variables for the Kalman filter may be phase and frequency:

$$X = \begin{bmatrix} \phi \\ f \end{bmatrix} \quad (68)$$

The state update matrix A may be modeled as:

$$A = \begin{bmatrix} 1 & 2\pi t_m \\ 0 & 1 \end{bmatrix} \quad (69)$$

The process noise may be modeled by:

$$w = \begin{bmatrix} w_\phi \\ w_f \end{bmatrix} \quad (70)$$

where $w_\phi$ and $w_f$ denote the process phase noise and frequency noise, respectively. These noises are introduced by the local clock oscillator and user movement. The state update function is thus:

$$X_{n+1} = AX_n + w \quad (71)$$

The variance of w may be determined by the specification of the oscillator and the dynamics of the application. In one embodiment, the variances of the process error may be modeled as being proportional to the time passed:

$$\sigma_\phi^2 = P_\phi t_m$$

$$\sigma_f^2 = P_f t_m \quad (72)$$

where $P_\phi$ and $P_f$ are the power of the phase random-walk noise and the power of the frequency random-walk noise, respectively. Both the phase random-walk noise and the frequency random-walk noise may be a combination of a clock phase or frequency random-walk noise and a phase or frequency random-walk noise due to the receiver's random motion. In practice, $P_\phi$ and $P_f$ can be estimated from the clock specification and the dynamics of the receiver. These parameters may also be adjusted empirically or by simulation until acceptable performance is reached. In another embodiment, the variances, as functions of time $t_m$, may be estimated by measuring the Allan Variance of the local clock, and considering the receiver's dynamics.

The process error covariance matrix is $$\Sigma_w = \begin{bmatrix} \sigma_\phi^2 & 0 \\ 0 & \sigma_f^2 \end{bmatrix} \quad (73)$$

Denote the measurement of the remaining phase as $\phi_m$, which can be obtained using Equation 59 above. Alternatively, if the remaining phase is small and the noise level is high, $\phi_m$ may be obtained using:

$$\phi_m = \text{phase}\left(\frac{\text{imag}(C_{max})}{E[|C_{max}|]}\right) \quad (74)$$

where imag(•) is the function that extracts the imaginary part of a complex number. $E[|C_{max}|]$ denotes the expected value of the magnitude of $C_{max}$. The measurement Y is given by:

$$Y = CX + u \quad (75)$$

where u denotes the measurement noise and C denotes the output matrix:

$$C = [1\ 0] \quad (76)$$

The variance $\sigma_u^2$ of u, which is a design parameter, is given by:

$$\sigma_u^2 = \frac{t_c \text{SNR}}{t_s} \quad (77)$$

The measurement y(n) is calculated using:

$$y(n) = \phi_m + \phi(n) \tag{78}$$

The covariance of the measurement is:

$$\Sigma_u = [\sigma_u^2] \tag{79}$$

The Kalman filter maintains an estimation of X and its covariance matrix $\Sigma_u$ base on parameters A, C, $\Sigma_w$, $\Sigma_u$, measurements y and the time of the measurements. The Kalman filter's time update and measurement update can be performed using the conventional Kalman filter constructs:

1. Time update:

$$X_{n+1} = AX_n$$

$$\Sigma_{X_{n+1}} = A\Sigma_{X_n}A^T + \Sigma_w \tag{80,81}$$

2. Measurement update:

$$X_n^+ = X_n^- + \Sigma_{X_n}^- C^T (C\Sigma_{X_n}^- C^T + \Sigma_u)^{-1}(y_n - CX)$$

$$\Sigma_{X_n}^+ = \Sigma_{X_n}^- + \Sigma_{X_n}^- C^T (C\Sigma_{X_n}^- C^T + \Sigma_u)^{-1} C\Sigma_{X_n}^- \tag{82,83}$$

where $X_n^-$ and $X_n^+$ denote the state variable before and after the measurement update, $\Sigma_{X_n}^-$ and $\Sigma_{X_n}^+$ denote the state covariance matrices before and after the update. Also note that $y_n - CX = \mu_m$ in equation 83.

The Kalman filter's covariance matrix $\Sigma_X$ offers a good estimate of the frequency error or accuracy $\delta f$, which may be used to determine the time interval $T_m$ between measurements:

$$T_m < \frac{1}{\delta f} \tag{84}$$

or with a safety factor $a_s < 1$.

$$T_m < \frac{\alpha_s}{\delta f} \tag{85}$$

In one embodiment $a_s = 0.3$, so as to avoid phase wrapping or skipping and phase accuracy may be maintained. The duration of convolution time $t_c$ can be similarly determine, using the two-step phase-frequency method described above.

In one embodiment of the invention, the behavior of the phase-frequency Kalman filter is coupled with status of the offset measurement:

1. choose the number of samples needed for convolution at the current SNR, such that the signal-to-noise ratio SNR of the convolution result satisfies the following equation with design parameter $\alpha_c \cong 1$.

$$N = \alpha_c \frac{1}{SNR} \tag{86}$$

Design parameter ac may be chosen empirically or by simulation. For example, in one embodiment, $\alpha_c = 0.5$.

2. determine the convolution time $t_c$, taking into consideration the number of skipped samples, so that N samples are expected to be taken during $t_c$:

$$t_c = 2t_s N \frac{M}{M - M_s} \tag{87}$$

where $M_s$ is the number of samples that are skipped in each section that contains a signal transition (i.e., in each category 1 section). The factor 2 results from the fact that about half of the sections are non-changing sections (i.e., category 0 sections).

3. adjust the convolution time.
   Calculate the phase error during next convolution time $t_c$, using $$\delta\phi = 2\pi\delta f t_c \tag{88}$$

If the phase error $\delta\phi$ is larger than a predetermined threshold $\phi_\alpha$, the convolution time is reduced to reduce the phase error:

$$t_{c0} = \frac{\phi_\alpha}{2\pi\delta f} \tag{89}$$

$t_{c0}$ is the "phase stable" time. In one embodiment one can select $\phi_\alpha$ to be $\pi/4$. If $t_c < t_{c0}$, one may use $t_{c0}$ as $t_c$. If $t_{c0}$ is longer than a certain threshold, one may skip a phase-frequency update. For example, the predetermined threshold may be $\alpha_{tc} t_c$, where $\alpha_{tc}$ is a design parameter, with a typical value greater than 2.

4. determine if samples should be skipped based on a previous estimate of the probability distribution, and whether or not a phase-frequency update is necessary. If the phase-update is necessary, the samples are not skipped.

5. calculate the convolutions, and update the SNR, the offset measurement, and the phase-frequency Kalman filter.

6. If the accuracy of the offset does not reach the predetermined value, repeat from step 1; otherwise, output the offset and keep the system in sleep or idle mode until next time when the next offset estimate is required. For example, when the system is required to have an offset output rate of 1 Hz, the system may go into sleep mode for a timer period equal to 1 second minus the time required to obtain an offset estimate with the required accuracy. That time required may be estimated based the time taken for the last offset estimate.

7. After "waking up" from the sleep mode, update the offset probability distribution and the Kalman filter according to the time passed. Then, repeat from step 1.

Putting a system into a sleep mode—in which minimal energy is used—reduces the overall energy cost.

Sample skipping may be realized not just at the accumulators described above. For example, if a sample need not participate in any of the computation, the sample can be skipped at the RF front end (e.g., not even selected for analog-to-digital conversion). Alternatively, a sample may be skipped in an offset estimator.

Multi-path is a major source of error in a GPS receiver and other time-of-flight measurement systems. The multi-path error can be detected using the accumulator results of the sections that have a transition (i.e., category 1 sections, when single-T categorization and masking are used). In one embodiment, a difference in accumulated values between adjacent samples $A_\delta(x)$ may be used to find the signal that arrived the earliest, which is more likely to be a line-of-sight path:

$$A_\delta(x) = A(1,x) - A(1,x-1) \tag{90}$$

In this regard, the total number of samples $N_{s2}(x)$ accumulated in the two accumulators is a useful parameter, given by:

$$N_{s2}(x)=N_s(1,x)+N_s(1,x-1) \quad (91)$$

When the following inequality is satisfied for any relative offset x, one may consider a signal detected:

$$|A_\delta(x)|>\alpha_A\sqrt{N_{s2}p_y} \quad (92)$$

Among the detected signal, the one with the earliest relative offset may be considered a line-of-sight signal. $\alpha_A$ is a design parameter, which is a given value between 2 and 3, in one embodiment. To avoid a multi-path error, skipping samples that contribute to measuring an early signal should be avoided. In one embodiment, a sample is skipped when:
1. all samples with a greater relative offset (i.e., samples of later arrival) are skipped; or
2. the sample has a greater offset (i.e., samples of later arrival) than the offset of a signal detected based on equation 92.

The phase measurement may be obtained using any carrier-phase method that can be used to estimate an object's position. Carrier-phase methods are described, for example, in the GPS/GNSS literature (e.g., "Global Position System: Signals, Measurement and Performance" ("Enge"), by Pratap Misra and Per Enge, and its cited references).

In a multipath environment, different components of the signal arriving at different times to the receiver have different phases. The accumulator values and the convolution results can be used to improve the phase estimation of the line-of-sight signal. In one embodiment, one can use the phase of the convolution value of the earliest arriving signal as the carrier phase, since it is a good estimate of the carrier phase of the signal of the shortest path (i.e., the line-of-sight signal). In another embodiment, one can detect the second earliest arriving signal using a method that is similar to that used to detect the earliest arriving signal discussed above). If the second earliest arrived signal is detected, one can use the accumulator values that are associated with offsets earlier or equal to the offset of the second earliest arrived signal to calculate the carrier phase of the line-of-sight signal. In another embodiment, for simplicity, one can use the accumulator values that are associated with offsets earlier or equal to the offset of the earliest arrived signal to calculate the carrier phase of the line of sight signal.

In applying any of the methods described above, one may trade-off between performance, power consumption and complexity. In some embodiments, some of the techniques described are not be used, or may be adjusted for a given application. For example, while the probability distribution is used in some embodiments for offset measurement, other methods exist that do not probability distribution directly. For example, in one embodiment a set of statistical states $S(x)$ is kept by the system. In that embodiment, offset measurement is achieved by:
1. initialize $S(x)$ by the log likelihood of the prior probability distribution of relative offset x.

$$S(x)=L(x) \quad (93)$$

2. accumulate samples and calculate convolutions using these samples.

Denote the result of the convolution for relative offset x as $C_b(x)$:
3. construct function $C_b'(x)$ such that the sum of $C_b'(x)$ over all relative offset x in the search space for relative offsets is zero; that is:

$$C_b'(x) = C_b(x) - \frac{1}{N_x}\sum_x C_b(x) \quad (94)$$

where $N_x$ is the number of estimated offsets over the search space.
4. update $S(x)$ using:

$$S^+(x)=S^-(x)+\alpha_{sc}C_b'(x) \quad (95)$$

where $S^-(x)$ and $S^+(x)$ are the states before and after the update, and where $\alpha_{sc}$ is a design parameter, having the value, for example, 0.3 in one embodiment.
5. keep only the positive terms in $S(x)$ $$S(x) = \begin{cases} S^+(x), & S^+(x) > 0 \\ 0, & \text{otherwise} \end{cases} \quad (96)$$

6. skip samples with relative offset x, if $S(x)=0$.
7. Repeat 2-6 until only one relative offset x remains; at which point, report relative offset x as the offset estimation.

In this method, statistical state $S(x)$ provides an indicator of the probability distribution. When $S(x)$ is small (e.g., $S(x)=0$), the corresponding probability $P(x)$ of relative offset x is small, and thus the corresponding samples may be skipped.

The above detailed description is provided to illustrate specific embodiments of the present invention and is not intended to be limiting. Numerous variations and modifications within the scope of the present invention are possible. The present invention is set forth in the accompanying claims.

I claim:

1. An apparatus for determining a distance based on a transmitted signal, comprising:
a storage device providing a first set of signal values representing time-ordered noise-less signal values of the transmitted signal, the first set of signal values being divided into sections, each section being associated according to a predetermined criterion with one of a plurality of categories, and each section having a predetermined number of signal values with each signal value being associated with a sample index representing a temporal position of the signal value in time;
a signal interface for receiving a second set of signal values representing digitized demodulated samples of a received signal, each of the signal values in the second set of signal values being assigned a category and a sample index based on a predetermined alignment in time with the signal values of the first set of signal values, wherein each signal value in the second set of signal value is assigned the same category and sample index as the corresponding signal value in the first set of signal values to which the signal value in the second set of signal values is aligned;
a set of accumulators each being associated with a corresponding one of the categories and a corresponding sample index, each accumulator being configured to sum a subset of signal values selected from the second set of signal values, the subset of signal values being signal values that are assigned to corresponding category and sample index; and
an arithmetic unit configured to compute one or more convolution of the transmitted signal and the received signal using the first set of signal values and the sums in the accumulators under one or more predetermined offsets in time relative to the predetermined alignment.

2. The apparatus of claim 1, wherein the predetermined criterion determined the associated category of a section based on signal transitions within the section.

3. The apparatus of claim 1, wherein the predetermined criterion determines the associated category of a section based on signal transitions in one or more sections previous in time or following in time relative to the section.

4. The apparatus of claim 1, wherein the transmitted signal comprises a plurality of chips, and wherein each section is bounded in time along boundaries of two selected chips.

5. The apparatus of claim 1, wherein the transmitted signal comprises a plurality of chips, and wherein each section is bounded in time along mid-points of two selected chips.

6. The apparatus of claim 1, wherein the signal interface is configured to receive the second set of signal values from an RF front end circuit.

7. The apparatus of claim 1, wherein each signal sample in the second set of signal samples is represented by a complex number, representing in-phase sampling and quadrature sampling of the received signal.

8. The apparatus of claim 1, wherein the predetermined alignment results from a coarse estimation step.

9. The apparatus of claim 1, wherein the predetermined alignment is provided by a server in communication with the apparatus over a telecommunication network.

10. The apparatus of claim 1, wherein the arithmetic unit computes the convolutions after applying a masking function on both the sums in the accumulators and the first set of signal values.

11. The apparatus of claim 10, wherein multiplying the masking function with itself is unity.

12. The apparatus of claim 1 wherein, using the largest one of the computed convolutions, the apparatus computes one of: a power of the received signal, an expected gain of a communication channel, a standard deviation of an additive noise, and a signal-to-noise ratio.

13. The apparatus of claim 1, wherein each accumulator keep tracks of the number of signal values summed.

14. The apparatus of claim 1, further comprising memory elements for maintaining a plurality of statistical states based on the convolutions.

15. The apparatus of claim 14, wherein the statistical states relate to a probability distribution.

16. The apparatus of claim 15, wherein the statistical states are represented by logarithms of probabilities computed from the probability distribution.

17. The apparatus of claim 16, wherein the probabilities are calculated from the correlations based on an additive Gaussian noise model.

18. The apparatus of claim 15, wherein the probability distribution relate to probabilities of the received signal is aligned in time with the transmitted signal under the predetermined alignment modified by predetermined offsets.

19. The apparatus of claim 18, wherein a portion of the second set of signal values assigned to a predetermined category is excluded from being summed in the accumulators, the predetermined category encompassing signal values of the first set of signal values in sections in which no signal transition occurs.

20. The apparatus of claim 18 wherein a signal value in the second set of signal values is summed in one of the accumulators only when the corresponding signal value in the first set of signal values to which the signal value in the second set of signal values immediately precedes or immediately follows a signal transition.

21. The apparatus of claim 18, wherein a portion of the second set of signal values are excluded from being summed in the accumulators, the portion of the second set of signal values corresponding to signal values at predetermined offsets corresponding to probabilities that are less than a predetermined threshold.

22. The apparatus of claim 15, using the computed convolutions and the probability distribution, the apparatus computes an expected offset relative to the predetermined alignment.

23. The apparatus of claim 22, wherein the apparatus operates in a sleep mode during which the arithmetic unit ceases computation of the convolutions, the apparatus enters into the sleep mode of operation for a predetermined time period after computing the expected offset.

24. The apparatus of claim 15, wherein the probability distribution is updated over time.

25. The apparatus of claim 24, wherein each convolution is computed based on earlier computed convolutions, the earlier computed convolutions being weighted by a factor that decays over time.

26. The apparatus of claim 1, further comprising a demodulator coupled to the signal interface, the demodulator providing the second set of signal samples after demodulating the received signal; and a numerically controlled oscillator that provides a timing signal to the demodulator.

27. The apparatus of claim 26, wherein the numerical oscillator adaptively updates a frequency and a phase of the timing signal.

28. The apparatus of claim 27, wherein the phase of the timing signal is updated based on an estimate of a phase of the received signal, the estimate of the phase of the received signal being derived from by the largest one of the computed convolutions.

29. The apparatus of claim 27, wherein the numerical oscillator updates the frequency and the phase of the timing signal at predetermined intervals, each predetermined interval having a duration based on a frequency resolution and a phase resolution of a frequency estimate and a phase estimate, respectively.

30. The apparatus of claim 27, wherein the frequency and the phase of the timing signal is updated according to a Kalman filter.

31. The apparatus of claim 13 wherein the apparatus determines that a signal of a predetermined offset is detected in the received signal when a predetermined parameter has a value exceeding a threshold, wherein the predetermined parameter is based on a difference in the accumulated values in two of the accumulators, and wherein the threshold is based in part on a sum of the signal values summed in the accumulators.

32. The apparatus of claim 31 wherein, when the apparatus determines two or more signal of different predetermined offsets are detected, the received signal is deemed to have the earliest of the predetermined offsets.

* * * * *